US011417053B1

(12) United States Patent
Yang et al.

(10) Patent No.: US 11,417,053 B1
(45) Date of Patent: Aug. 16, 2022

(54) METHODS AND SYSTEMS FOR FORMING PERSONALIZED 3D HEAD AND FACIAL MODELS

(71) Applicant: TENCENT AMERICA LLC, Palo Alto, CA (US)

(72) Inventors: Bo Yang, Shenzhen (CN); Songrun Liu, Shenzhen (CN); Bo Wang, Shenzhen (CN)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/202,121

(22) Filed: Mar. 15, 2021

(51) Int. Cl.

| | |
|---|---|
| ***G06T 15/20*** | (2011.01) |
| ***A63F 13/655*** | (2014.01) |
| ***G06N 3/04*** | (2006.01) |
| ***G06T 19/20*** | (2011.01) |
| ***G06V 40/16*** | (2022.01) |

(52) U.S. Cl.
CPC .......... *G06T 15/205* (2013.01); *A63F 13/655* (2014.09); *G06N 3/04* (2013.01); *G06T 19/20* (2013.01); *G06V 40/165* (2022.01); *G06V 40/171* (2022.01); *G06V 40/172* (2022.01)

(58) Field of Classification Search
None
See application file for complete search history.

(56) References Cited

U.S. PATENT DOCUMENTS

| | | | | |
|---|---|---|---|---|
| 2018/0374242 | A1* | 12/2018 | Li | G06V 40/169 |
| 2019/0340419 | A1* | 11/2019 | Milman | G06N 3/088 |
| 2020/0051303 | A1* | 2/2020 | Li | G06T 13/40 |
| 2020/0327726 | A1* | 10/2020 | Lin | G06V 10/82 |
| 2021/0042503 | A1* | 2/2021 | Karras | G06N 3/088 |

OTHER PUBLICATIONS

Fabien Danieau, Ilja Gubins, Nicolas Olivier, Olivier Dumas, Bernard Denis, Thomas Lopez, Nicolas Mollet, Brian Frager, Quentin Avril, "Automatic Generation and Stylization of 3D Facial Rigs", Mar. 27, 2019, IEEE, 2019 IEEE Conference on Virtual Reality and 3D User Interfaces, pp. 784-792.*

Koki Nagano, Jaewoo Seo, Jun Xing, Lingyu Wei, Zimo Li, Shunsuke Saito, Aviral Agarwal, Jens Fursund, Hao Li, "paGAN: Real-time Avatars Using Dynamic Textures", Nov. 2018, ACM, ACM Transactions on Graphics, vol. 37, No. 6, Article 258.*

(Continued)

*Primary Examiner* — Robert Bader
(74) *Attorney, Agent, or Firm* — Morgan, Lewis & Bockius LLP

(57) ABSTRACT

An electronic apparatus performs a method of customizing a standard face of an avatar in a game using a two-dimensional (2D) facial image of a real-life person that includes: identifying a set of real-life keypoints in the 2D facial image; transforming the set of real-life keypoints into a set of game-style keypoints associated with the avatar in the game; generating a set of control parameters of the standard face of the avatar in the game by applying the set of game-style keypoints to a keypoint to parameter (K2P) neural network model; and deforming the standard face of the avatar in the game based on the set of control parameters, wherein the deformed face of the avatar has the facial features of the 2D facial image.

20 Claims, 34 Drawing Sheets

(56) References Cited

OTHER PUBLICATIONS

Justus Thies, Michael Zollhofer, Marc Stamminger, Christian Theobalt, Matthias Nießner, "Face2Face: Real-time Face Capture and Reenactment of RGB Videos", Jan. 2019, ACM, Communications of the ACM, vol. 62, Issue 1, pp. 96-104.*
Wang Yifan, Noam Aigerman, Vladimir G. Kim, Siddhartha Chaudhuri, Olga Sorkine-Hornung, "Neural Cages for Detail-Preserving 3D Deformations", Jun. 19, 2020, IEEE, 2020 IEEE/CVF Conference on Computer Vision and Pattern Recognition (CVPR), 72-80.*
Marek Kowalski, Jacek Naruniec, Tomasz Trzcinski, "Deep Alignment Network: A convolutional neural network for robust face alignment", Jul. 26, 2017, IEEE, 2017 IEEE Conference on Computer Vision and Pattern Recognition Workshops (CVPRW), pp. 2034-2043.*
Ruizheng Wu, Xiaodong Gu, Xin Tao, Xiaoyong Shen, Yu-Wing Tai, Jiaya Jia, "Landmark Assisted CycleGAN for Cartoon Face Generation", Jul. 2, 2019, arXiv:1907.01424.*

* cited by examiner

1000

FIG. 12
Original Image 1202
After Rotation Alignment 1204
Skin Color Detection Regions 1206
1208

Original Mesh 2502

Mesh with blend weights rendering 2504

Deformed mesh with Blendshape 2506

Deformed mesh without Blendshape 2508

3202
3204
3206
3208

3300

METHODS AND SYSTEMS FOR FORMING PERSONALIZED 3D HEAD AND FACIAL MODELS

CROSS-REFERENCE TO RELATED APPLICATIONS

This application relates to (i) U.S. application Ser. No. 17/202,112, entitled "METHODS AND SYSTEMS FOR PERSONALIZED 3D HEAD MODEL DEFORMATION" filed on Mar. 15, 2021; (ii) U.S. application Ser. No. 17/202,100, entitled "METHODS AND SYSTEMS FOR CONSTRUCTING FACIAL POSITION MAP" filed on Mar. 15, 2021; and (iii) U.S. application Ser. No. 17/202,116, entitled "METHODS AND SYSTEMS FOR EXTRACTING COLOR FROM FACIAL IMAGE" filed on Mar. 15, 2021, all of which are incorporated by reference in their entirety.

TECHNICAL FIELD

The present disclosure relates generally to image technologies, and in particular, to image processing and head/facial model formation methods and systems.

BACKGROUND

Commercial facial capturing systems with multiple sensors (e.g., multi-view camera, depth sensors, etc.) are used to obtain an accurate three-dimensional (3D) face model for a person with or without explicit markers. These tools capture the geometry and texture information of a human face from multiple sensors and fuse the multi-modal information to a general 3D face model. Benefiting from the multi-modal information from various sensors, the obtained 3D face model is accurate. However, these commercial systems are expensive and additional software purchase is needed to process the raw data. In addition, these systems are usually deployed at facial capturing studio, actors or volunteers are needed to acquire data, which make the data collection process time-consuming and even more costly. In short, the facial capturing systems are expensive and time-consuming to acquire 3D face data. On the contrary, smart phones or camera are widely available nowadays so there are potentially large amount RGB (red, green, blue) images available. Taking RGB images as input to produce 3D face model can benefit from the large amount of image data.

Two-dimensional (2D) RGB image is just the projection of 3D world to 2D plane. Recovering the 3D geometry from a 2D image is an ill-posed problem that requires optimization or learning algorithms to regularize the reconstruction process. For 3D face reconstruction, parameterized facial model 3D Morphable Model (3DMM) based method has been developed and used. In particular, facial models like Basel Face Model (BFM) and Surrey Face Model (SFM) are the commonly used facial models, which require commercial licensing. Face model based methods take a set of scanned 3D human face models (demonstrating a variety of facial features and expressions) as their basis, and then produce parameterized representations of facial features and expression based on the 3D face models. A new 3D face can be expressed as the linear combination of the basis 3D face models based on the parameterization. Because of the nature of these methods, the 3D face models used to form the basis and the parameter space limit the expressiveness of the facial model based methods. In addition, the optimization process that fits the 3DMM parameters from an input face image or 2D landmarks further sacrifices the detailed facial features in the face image. Therefore, facial model based methods cannot accurately recover the 3D facial features and commercial licensing is needed to use the facial models such as BFM and SFM.

With the popularization of deep learning algorithms, semantic segmentation algorithms have gained a lot of attention. Such algorithms can divide each pixel in a face image into different categories, such as background, skin, hair, eyes, nose, and mouth.

Although Sematic Segmentation method can achieve relatively accurate results, semantic segmentation of all pixels is a very complex problem, which often requires a complex network structure, resulting in high computational complexity. In addition, in order to train a semantic segmentation network, a large amount of training data needs to be labeled, and semantic segmentation needs to divide the pixels of the entire image, which is very tedious, time-consuming, and costly. Therefore, it is not suitable for scenes that do not require high average color accuracy, but require high efficiency.

Keypoint-driven deformation methods that optimize Laplacian and other derived operators have been well studied in academia. The math expression of Biharmonic deformation can be noted as $\Delta^2 x'=0$. The constrained keypoints, namely the boundary conditions, can be expressed as $x_b'=x_{bc}$. In the above equations, $\Delta$ is the Laplacian operator, x' are the unknown deformed mesh vertices' positions, and $x_{bc}$ are given keypoints' positions after deformation. The solutions of bi-Laplace equations are needed in each dimension. Biharmonic functions are solutions to the bi-Laplace equations, but also minimizers of the so-called "Laplacian energy".

The nature of energy minimization is the smoothing of the mesh. If directly applying the aforementioned minimizer, all the detailed features will be smoothed out. Besides, when the keypoints' positions stay unchanged, the deformed mesh is expected to be exactly the same as the original mesh. Out of these considerations, a preferred usage of biharmonic deformation is to solve the vertices' displacement other than their positions. In this way the deformed positions can be written as $x'=x+d$, where d is the displacement of the unknown vertices in each dimension. Naturally, the equations of biharmonic deformation becomes $\Delta^2 d=0$ subjected to $d_b=x_{bc}-x_b$, where $d_b$ is displacements of the keypoints after deformation.

With the rapid development of the game industry, customized face avatar generation has become more and more popular. For ordinary players without artistic skills, it is very difficult to tune the control parameters to generate a face that can describe subtle variations.

In some existing face generation systems and methods, such as the Justice Face Generation System, the prediction of the face model is to predict the 2D information in the image, such as the segmentation of the eyebrows, mouth, nose and other pixels in the photo. These 2D segmentations are easily affected by out-of-plane rotation and partial occlusion, and a frontal face is basically required. In addition, since the similarity of the final game face avatar and the input is determined by the face recognition system, which limits this method to only real style games. If the style of the game is cartoon style, which is quite different from the real face, this method cannot be used.

In some other existing face generation systems and methods, such as the Moonlight Blade Face Generation System, the real face is reconstructed from the input image. This method is limited to the real style games and cannot be applied to the cartoon style games. Second, the output parameter of this method is the reconstructed game-style face mesh, and then template matching is performed on each part of the mesh. This approach limits the combinations of different face parts. The overall diversity of game faces is closely related to the number of pre-generated templates. If a certain part, such as the mouth shape, has a small number of templates, it may produce few different variations, making the generated face lack of diversity.

SUMMARY

Learning based face reconstruction and keypoint detection methods rely on 3D ground-truth data as a gold standard to train the models that approximate as close as possible to the ground-truth. Therefore, the 3D ground-truth determines the upper bound of the learning based approaches. To ensure the accuracy of face reconstruction and the desirable keypoint detection, in some embodiments, 2D facial keypoints annotation is used to generate the ground-truth of a 3D face model without using an expensive face capturing system. The approach disclosed herein generates the 3D ground-truth face model which preserves the detailed facial features of an input image, overcomes the shortcomings of the existing facial models, such as 3DMM based methods that lose the facial features, and also avoids the use of parameterized facial models like BFM and SFM (commercial licensing is needed for both) that are required by some existing facial model based methods.

Apart from the facial keypoint detection, in some embodiments, multi-task learning and transfer learning solutions are implemented for facial feature classification tasks, so that more information can be extracted from an input face image, which is complementary to the keypoints information. The detected facial keypoints with the predicted facial features together are valuable to computers or mobile games for creating the face avatar of the players.

In some embodiments, a lightweight method is disclosed herein for extracting the average color of each part of a human face from a single photo, including average colors of skin, eyebrow, pupil, lip, hair, and eye shadow. At the same time, an algorithm is also used to automatically convert the texture map based on the average color, so that the converted texture still has the original brightness and color differences, but the main color becomes the target color.

With the rapid development of computer vision and artificial intelligence (AI) techniques, the capturing and reconstruction of 3D human facial keypoints have achieved a level of high precision. More and more games are taking advantage of the AI detections to make game characters more vivid. The method and system disclosed herein customize 3D head avatars based on reconstructed 3D keypoints. A general keypoint-driven deformation is applicable to arbitrary meshes. The process of head avatar customization and the deformation method proposed herein could find their applications in scenarios such as automatic avatar creation and expression reoccurrence.

Methods and systems for automatically generating the face avatar in the game based on a single photo are disclosed herein. Through the prediction of face keypoints, the automatic processing of keypoints, and the use of deep learning methods to predict model parameters, the system disclosed herein can automatically generate the face avatar in the game to make it: 1) have the characteristics of the real face in the photo; 2) conform to the target game style. This system can be applied to face generation for real-style games and cartoon-style games at the same time, and can be easily adjusted automatically according to different game models or bone definitions.

According to a first aspect of the present application, a method of constructing a facial position map from a two-dimensional (2D) facial image of a real-life person includes: generating a coarse facial position map from the 2D facial image; predicting a first set of keypoints in the 2D facial image based on the coarse facial position map; identifying a second set of keypoints in the 2D facial image based on user-provided keypoint annotations; and updating the coarse facial position map so as to reduce the differences between the first set of keypoints and the second set of key points in the 2D facial image.

In some embodiments, the method of constructing a facial position map from a 2D facial image of a real-life person further includes extracting a third set of keypoints based on the updated facial position map as a final set of keypoints, and the third set of keypoints have the same location as the first set of keypoints in the facial position map.

In some embodiments, the method of constructing a facial position map from a 2D facial image of a real-life person further includes reconstructing a three-dimensional (3D) facial model of the real-life person based on the updated facial position map.

According to a second aspect of the present application, a method of extracting color from a two-dimensional (2D) facial image of a real-life person includes: identifying a plurality of keypoints in the 2D facial image based on a keypoint prediction model; rotating the 2D facial image until the selected keypoints from the plurality of keypoints are aligned; locating a plurality of parts in the rotated 2D facial image, wherein each part is defined by a respective subset of the plurality of keypoints; extracting, from the pixel values of the 2D facial image, the average color for each of the plurality of the parts defined by a corresponding subset of keypoints; and generating a personalized three-dimensional (3D) model of the real-life person that mimics the respective facial feature color of the 2D facial image using the extracted colors of the plurality of the parts in the 2D facial image.

According to a third aspect of the present application, a method of generating a three-dimensional (3D) head deformation model, includes: receiving a two-dimensional (2D) facial image; identifying a first set of keypoints in the 2D facial image based on artificial intelligence (AI) models; mapping the first set of keypoints to a second set of keypoints based on a set of user-provided keypoint annotations located on a plurality of vertices of a mesh of a 3D head template model; performing deformation to the mesh of the 3D head template model to obtain a deformed 3D head mesh model by reducing the differences between the first set of keypoints and the second set of keypoints; and applying a blendshape method to the deformed 3D head mesh model to obtain a personalized head model according to the 2D facial image.

According to a fourth aspect of the present application, a method of customizing a standard face of an avatar in a game using a two-dimensional (2D) facial image of a real-life person, includes: identifying a set of real-life keypoints in the 2D facial image; transforming the set of real-life keypoints into a set of game-style keypoints associated with the avatar in the game; generating a set of control parameters of the standard face of the avatar in the game by applying the set of game-style keypoints to a keypoint to parameter (K2P) neural network model; and deforming the standard face of the avatar in the game based on the set of control parameters, wherein the deformed face of the avatar has the facial features of the 2D facial image.

According to a fifth aspect of the present application, an electronic apparatus includes one or more processing units, memory and a plurality of programs stored in the memory. The programs, when executed by the one or more processing units, cause the electronic apparatus to perform the one or more methods as described above.

According to a sixth aspect of the present application, a non-transitory computer readable storage medium stores a plurality of programs for execution by an electronic apparatus having one or more processing units. The programs, when executed by the one or more processing units, cause the electronic apparatus to perform the one or more methods as described above.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
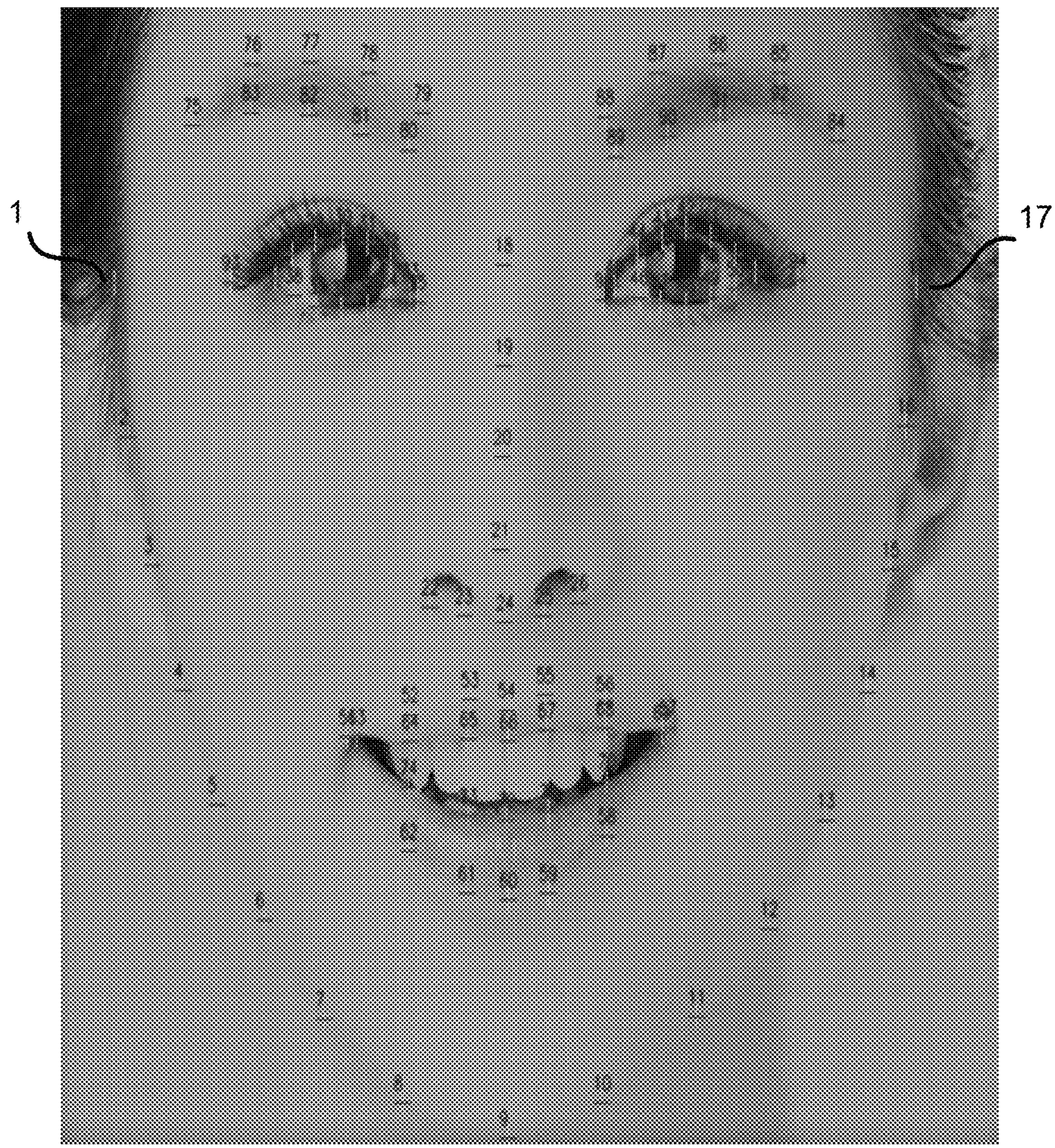
FIG. 1 is a diagram illustrating an exemplary keypoints definition in accordance with some implementations of the present disclosure.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices.

Before the embodiments of the present application are further described in detail, names and terms involved in the embodiments of the present application are described, and the names and terms involved in the embodiments of the present application have the following explanations.

Facial keypoints: pre-defined landmarks that determine shapes of certain facial parts, e.g., corners of eyes, chins, nose tips, and corners of mouth.

Face parts: face border, eyes, eyebrows, nose, mouth and other parts.

Face reconstruction: reconstructing the 3D geometry structure of a human face, and commonly used representations including mesh model, point cloud, or depth map.

RGB image: red, green, blue three channel image format.

Position map: using the red, green, blue channels in regular image format to store the x, y, z coordinates of a face area, which is a representation of a 3D human face.

Facial feature classification: including hairstyle classification, with or without eyeglass classification.

Convolutional neural network (CNN): a class of deep neural networks, most commonly applied to analyzing visual imagery.

Base network: a network like CNN that is used by one or multiple downstream tasks to serve as a feature extractor.

Laplacian operator: a differential operator given by the divergence of the gradient of a function on Euclidean space.

Differentiable manifold: a type of topological space that is locally similar to a linear space to allow one to do calculus.

Biharmonic functions: a quartic differentiable function with a square Laplacian operator equals to 0, defined on differentiable manifold.

Keypoint-driven deformation: a class of methods that deforms meshes by changing certain vertices' positions.

Biharmonic deformation: a deformation method which employs the optimization of biharmonic functions with some boundary conditions.

Affine deformation: a keypoint-driven deformation method proposed in this disclosure, which optimizes the affine transformations of triangles to achieve the purpose of mesh deformation.

Face model: a mesh of standard faces in a predefined target game.

Bones/Sliders: control parameters to deform a face model.

As aforementioned, even feeding both input 2D image and 2D keypoints to the optimization process to fit 3DMM parameters, the optimization has to balance between the fitting of a 3D facial model based on the basis (i.e., the 3D face model set) and the fidelity of 2D keypoints. That optimization leads to the obtained 3D facial model defying the 2D input keypoints so that the detailed facial information brought by the input 2D keypoints is sacrificed. Among the existing 3D facial reconstruction methods, facial capturing solution can produce accurate reconstruction but is expensive and time-consuming, and the obtained data also demonstrates limited variations in facial features (limited number of actors). On the other hand, facial model based methods can take a 2D image or 2D landmark annotations as input, but the obtained 3D model is not accurate. To meet the requirement of rapid development of computers/mobile games, both producing desirable 3D model accuracy and reducing the cost and time needed are required. To meet these requirements, a new 3D ground-truth facial model generation algorithm disclosed herein takes a 2D image, 2D keypoints annotation, and coarse 3D facial model (position map format) as input, transforms the coarse 3D model based on the 2D keypoints, and finally produces a 3D facial model where the detailed facial features are well preserved.

Other than solving the key issue in face reconstruction and keypoints prediction, multi-task learning and transfer learning based approaches for facial feature classification are also disclosed herein, partly building on top of the face reconstruction and keypoints prediction framework. In particular, reusing the base network of face reconstruction and keypoints prediction, the eyeglass classification (with or without eyeglasses) is accomplished via multi-task learning. A linear classifier on top of the existing face reconstruction and keypoints prediction framework is trained, which greatly reuses the existing model and avoids introducing another larger network for image feature extraction. In addition, another shared base network is used for male and female hairstyle classification. Hairstyle is a type of important facial feature that is complementary to facial keypoints or 3D facial model. In the process of creating a 3D avatar for a user, adding hairstyle and eyeglass predictions can better reflect the user's facial features and provide better personalization experience.

Face keypoints prediction has been a research topic in computer vision for decades. With the development of artificial intelligence and deep learning in recent years, convolutional neural network (CNN) facilitates the progress of face keypoints prediction. 3D facial reconstruction and face keypoint detection are two intertwined problems, solving one can simplify the other. A traditional way is to solve 2D face keypoint detection first, and then based on the estimated 2D face keypoints to further infer 3D facial model. However, when a face in image is tilted (nodding or shaking head), certain face keypoints are occluded and lead to erroneous 2D face keypoints estimation, so the 3D facial model building on top of the erroneous 2D face keypoints becomes inaccurate.

As ground-truth data determines the upper bound of the deep learning based methods, existing 3D face model datasets are not only limited in number but also available to academic research only. Face model based methods on the other hand require to use Basel Face Model (BFM) or Surrey Face Model (SFM) that both need commercial licensing. High accuracy and large quantity 3D ground-truth becomes the most critical problem in training any face reconstruction or keypoint estimation models.

Other than face keypoint prediction, facial feature classification is an important aspect of the user 3D avatar creation. With predicted face keypoints, only style transfer of the face part of a user (i.e., eyes, eyebrows, nose, mouth, and face contour) can be performed. However, to better reflect the facial features of a user, matching the user's hairstyle, and adding a pair of eyeglasses if the user wears one in the input image are very helpful. Based on these requirements, multi-task learning and transfer learning based facial feature classification approaches are developed to achieve male/female hairstyle prediction, and eyeglass prediction (with or without), which make the created face avatar more personalized to improve the user's experience.

In some embodiments, in order to represent the three-dimensional shape of the main part of the face, the keypoints representation is used as shown in FIG. 1. FIG. 1 is a diagram illustrating an exemplary keypoints definition in accordance with some implementations of the present disclosure. The keypoints are numbered in sequence defining specific features of the face. The keypoints focus on the boundary of major parts of the face, for example, the contour of the face, the contour of the eyes, and the contour of the eyebrows. More keypoints mean greater difficulty in prediction, but more accurate shape representation. In some embodiments, the definition of 96 key points is adopted in FIG. 1. In some embodiments, users can modify the specific definitions and the number of keypoints according to their own needs.

Many algorithms can predict the three-dimensional coordinates of keypoints of a human face. The methods with better performance use deep learning algorithms based on a large amount of offline 3D training data. However, in some embodiments, any three-dimensional keypoint prediction algorithm can be used. In some embodiments, the definition of keypoints is not fixed and users could customize the definitions according to their necessity.

Figure 2:
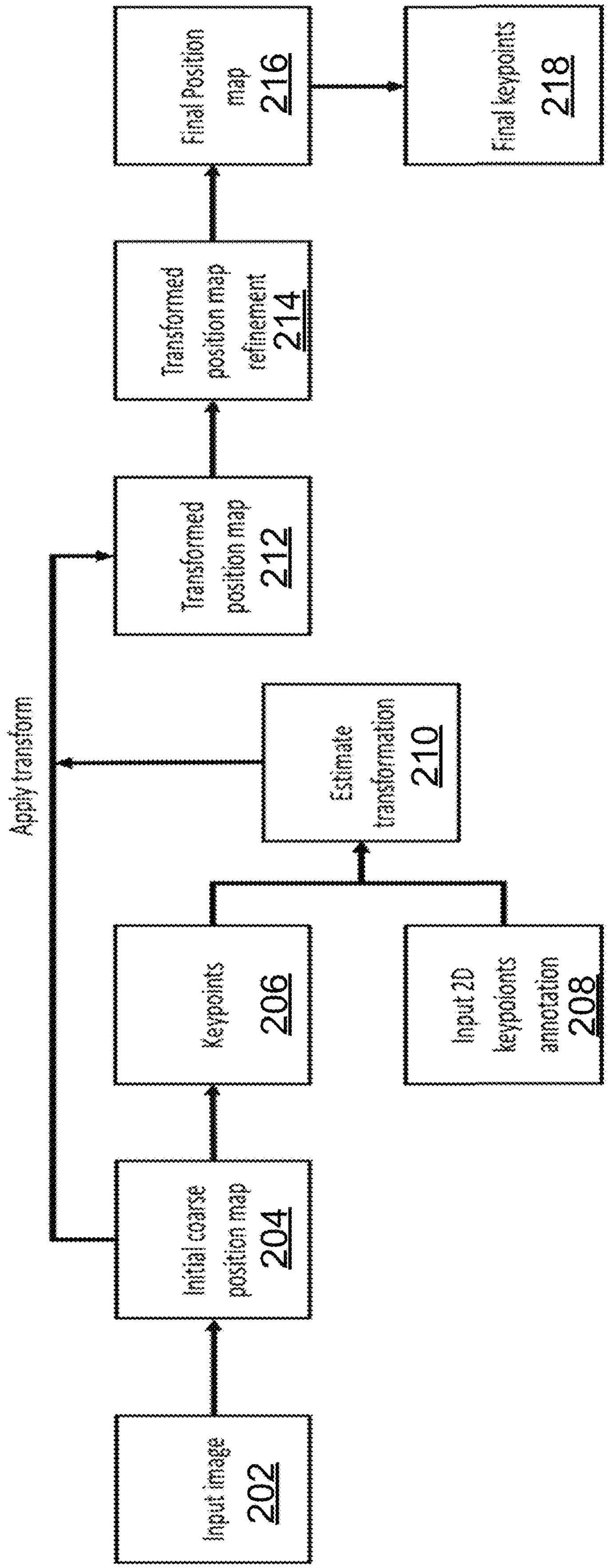
FIG. 2 is a block diagram illustrating an exemplary keypoint generation process in accordance with some implementations of the present disclosure.

To solve the problem of 3D ground-truth facial model generation, the following automatic algorithm is developed that takes the 2D RGB image, the 2D keypoints annotation, and the coarse position map as input. FIG. 2 is a block diagram illustrating an exemplary keypoint generation process in accordance with some implementations of the present disclosure.

Figure 3:
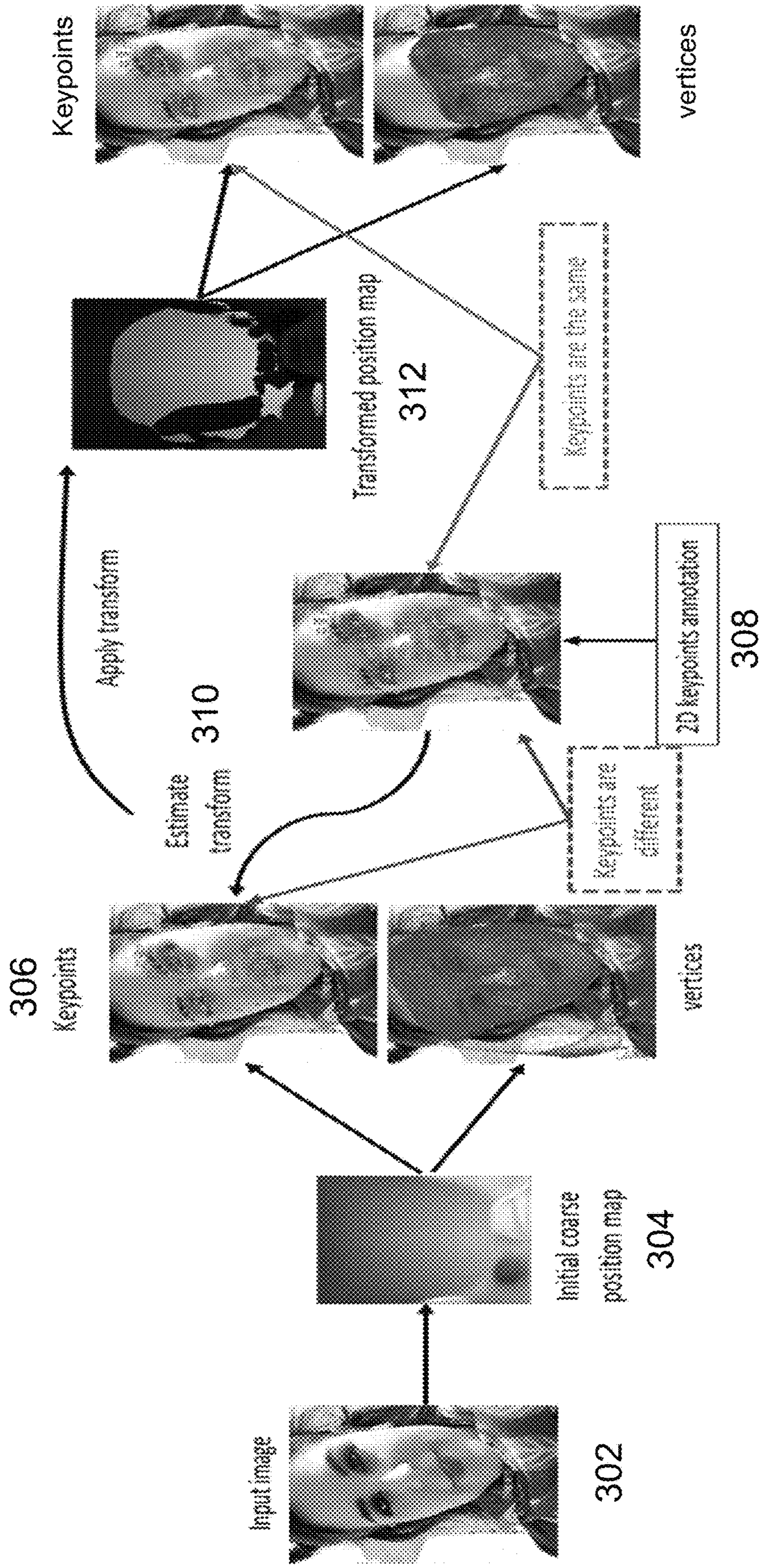
FIG. 3 is a diagram illustrating an exemplary process of transforming the initial coarse position map in accordance with some implementations of the present disclosure.

FIG. 3 is a diagram illustrating an exemplary process of transforming the initial coarse position map in accordance with some implementations of the present disclosure.

In some embodiments, a 3D reconstruction method is used to convert an input facial image to a position map which contains 3D depth information for facial features. For example, a position map may be a 2D three color (RGB) channel map with 256 by 256 matrix array and each of the array elements has coordinates (x, y, z) representing a 3D location on a facial model. The 3D position coordinates (x, y, z) are represented by the RGB pixel values on the position map for each array element. A particular facial feature is located on a fixed 2D location within the 2D position map. For example, a tip of the nose can be identified by 2D array element position at X=128 and Y=128 within the position map. Similarly, a specific keypoint identified for a particular facial feature on a face can be located at the same array element position on the 2D position map. The specific keypoints, however, can have different 3D position coordinates (x, y, z) depending on the different input facial image for the position map.

In some embodiments, as shown in FIG. 2 and FIG. 3, a 3D reconstruction method is utilized to obtain the initial coarse position map (204, 304) from the input image (202, 302). And then the input 2D keypoints annotation (208, 308) is used to adjust the (x, y) coordinates of the according keypoints (206, 306) of the initial position map, to ensure the adjusted (x, y) coordinates of the keypoints in the adjusted position map to be the same as the annotated 2D keypoints. In particular, first, a set of 96 keypoints from the initial position map P is obtained. Based on the keypoints indices, the set of 96 keypoints is referred as K=k_i, where each k_i is the 2D coordinate (x, y) of the keypoint, and i=0, . . . , 95. From the 2D keypoints annotation (208, 308), a second set of 96 keypoints A=a_i is obtained, which is 2D (x, y) coordinate, and i=0, . . . , 95. Secondly, the spatial transformation mapping (210. 310) is estimated from K to A, defined as T: $\Omega \rightarrow \Omega$, where $\Omega \subset R\hat{}2$. And then the obtained transformation T is applied to the initial position map P to get the transformed position map P' (212, 312). In this way, the transformed position map P' (212, 312) preserves the detailed facial features of the person in the input image (202, 302), and at the same time, the transformed position map P' (212, 312) is of reasonable 3D depth information. Therefore, the solution disclosed herein provides an accurate and practical alternative solution to generate 3D ground-truth information to avoid using the expensive and time-consuming face capturing system.

Figure 4:
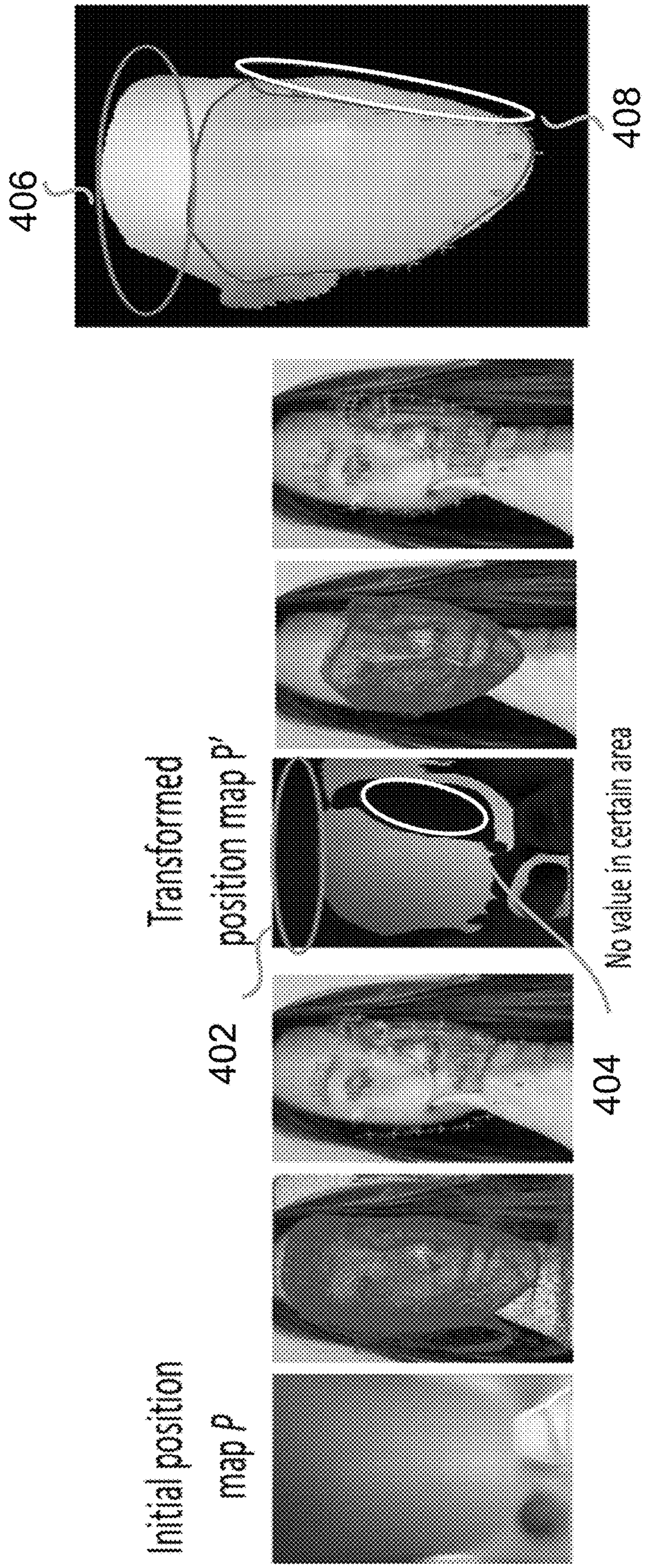
FIG. 4 is a diagram illustrating an exemplary transformed position map that does not cover the whole face area in accordance with some implementations of the present disclosure.

In some embodiments, as the 96 facial keypoints cover only part of the whole face area (i.e., below eyebrows, inside of face contour), for example, in FIG. 3, the keypoints from ear to chin is along the low jaw, but not on the visible face contour. When a face in the input image is tilted, the whole face area is not covered by the contour of the keypoints connected together. In addition, when performing manual keypoints annotation, no matter a face in an image is tilted or not, keypoints can only be labeled along the visible face contour (i.e., no way to annotate accurately the occluded keypoints). As a result, in the transformed position map P' (212, 312), part of the face area does not have valid values due to the transformation mapping T (210. 310) does not have an estimation in the region. In addition, the forehead area is above eyebrows, so T does not have estimation as well in that area. All of these issues cause the transformed position map P' (212, 312) have no valid values in certain area. FIG. 4 is a diagram illustrating an exemplary transformed position map that does not cover the whole face area in accordance with some implementations of the present disclosure.

In FIG. 4, the top circle (402, 406) highlights the forehead area and the right circle (404, 408) indicates the region where the keypoints contour is smaller than the visible face contour.

In some embodiments, in order to solve the above issues and make the algorithm robust to tilted faces that are commonly present in face images, a refinement process 214 as shown in FIG. 2 is used. The keypoints from transformed position map are shifted along the face contour to match the visible face contour based on the head pose and the coarse 3D facial model. After that, the missing values in the face contour area can be filled out in the obtained position map. However, the values in the forehead region are still missing. To cover the forehead region, the control points are expanded by adding eight landmarks at four corners of the image to both keypoints sets K and A.

Figure 5:
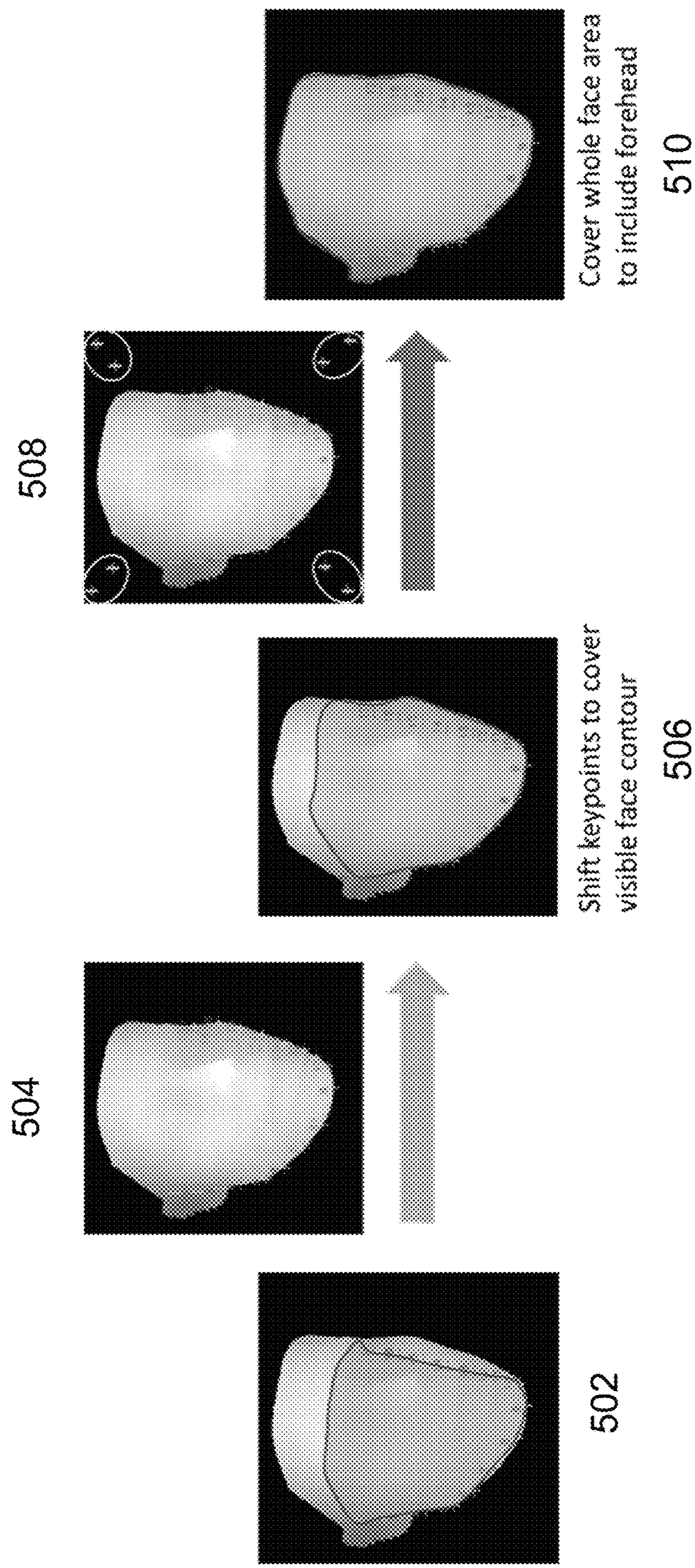
FIG. 5 is a diagram illustrating an exemplary process of refining the transformed position map to cover the whole face area in accordance with some implementations of the present disclosure.

FIG. 5 is a diagram illustrating an exemplary process of refining the transformed position map to cover the whole face area in accordance with some implementations of the present disclosure. The position map refinement processing is shown in FIG. 5.

In some embodiments, the head pose is first determined based on the coarse position map P to determine the head is tilted towards the left or right, and the left or right is defined in the 3D face model space (e.g., as shown in FIG. 5, the face is titled towards the left). Based on a determination that the face is tilted towards the left or right, the keypoints of the corresponding side of face contour are adjusted. The right side keypoints of the face contour have indices from 1 to 8, and the left side keypoints of the face contour have indices from 10 to 17. Using the face tilted towards the left as an example, the 2D projection of the initial position map P is computed to get the depth map as the image 502 shown in FIG. 5. The left face contour keypoints $k_i$, i=10, . . . , 17 are shifted rightward individually until they reach the boundary of the depth map. Then the new coordinates are used to replace the original keypoint locations. Similarly, when the face is tilted rightward, the processed keypoints are indexed by $k_i$, i=1, . . . , 8 and the search direction is left. After adjusting the face contour keypoints, the updated keypoints are visualized as the image 504 in FIG. 5 and the updated coverage of the position map is shown as the image 506 in FIG. 5. The updated position map has better coverage of face in the face contour area, but the forehead area still has missing values.

In some embodiments, in order to cover the forehead area, two anchor points are added at each corner of the image domain Ω as additional keypoints, $k_i$, i=96, . . . , 103, to get updated keypoints set K' (as shown in the image 508 in FIG. 5). The same is done for the manual annotation keypoints set, $a_i$, i=96, . . . , 103, to get updated A'. Using the updated keypoints sets K' and A', the transformation mapping T' is re-estimated, and then is applied to the initial position map P to get the final position map P" (216 in FIG. 2) to cover the whole face area (as shown in the image 510 in FIG. 5). The final keypoints 218 are derived from the final position map 216.

Figure 6:
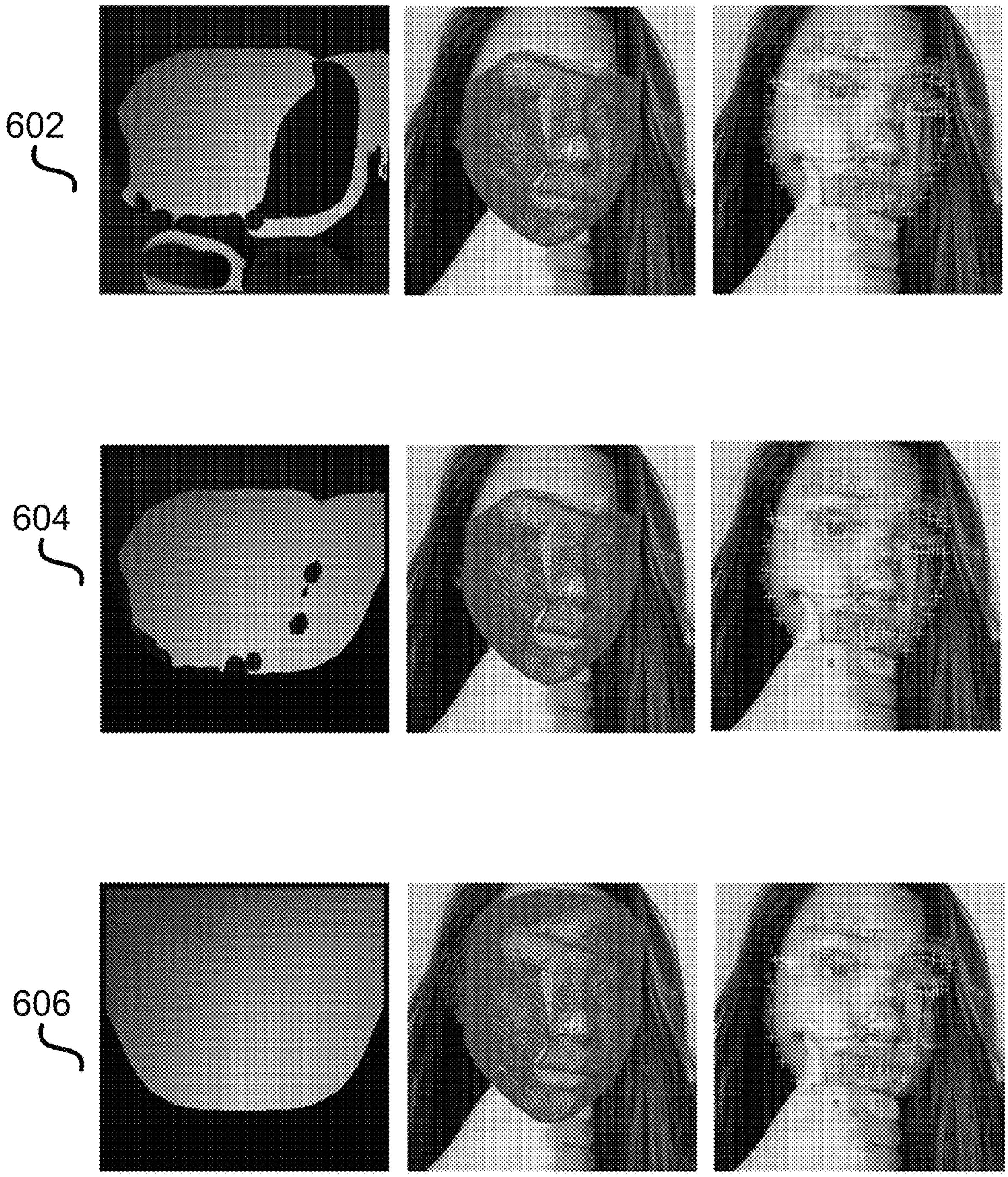
FIG. 6 is a diagram illustrating some exemplary results of the position map refinement algorithm in accordance with some implementations of the present disclosure.

FIG. 6 is a diagram illustrating some exemplary results of the position map refinement algorithm in accordance with some implementations of the present disclosure. 602 is an illustration of the initial transformed position map. 604 is an illustration of the updated position map after fixing face contour. 606 is an illustration of the final position map.

Figure 7A:
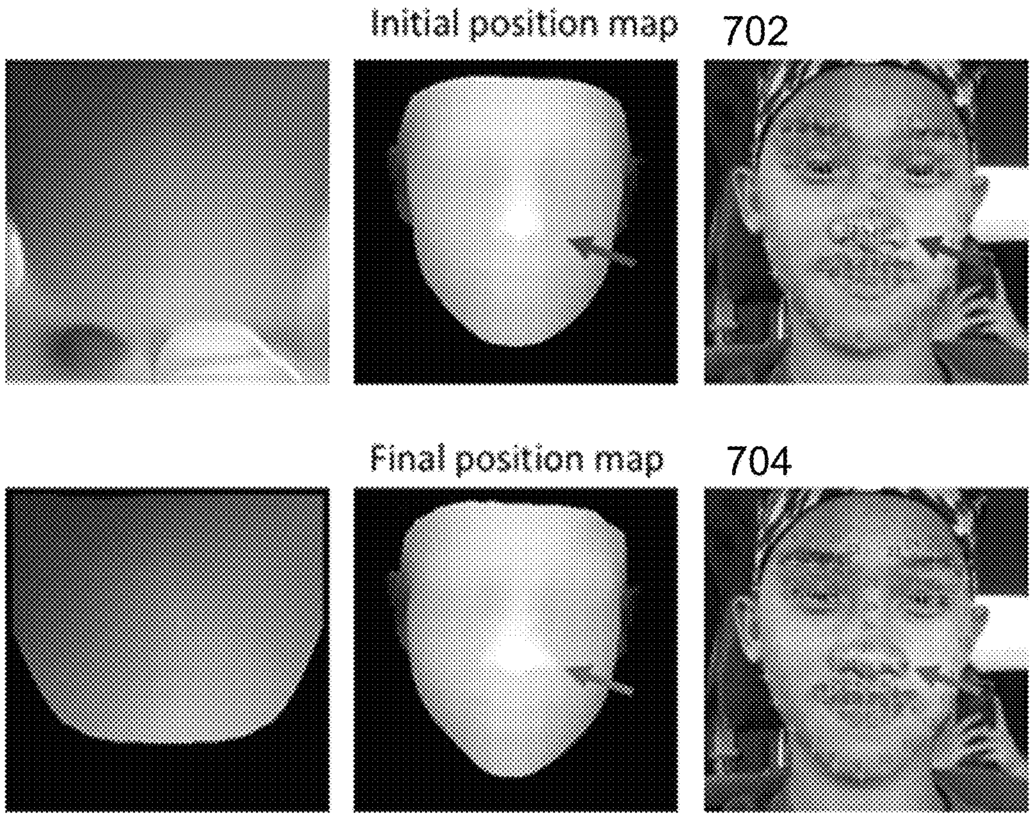
FIGS. 7A and 7B illustrate some exemplary comparisons of the final position map against the initial coarse position map in accordance with some implementations of the present disclosure.
Figure 7B:
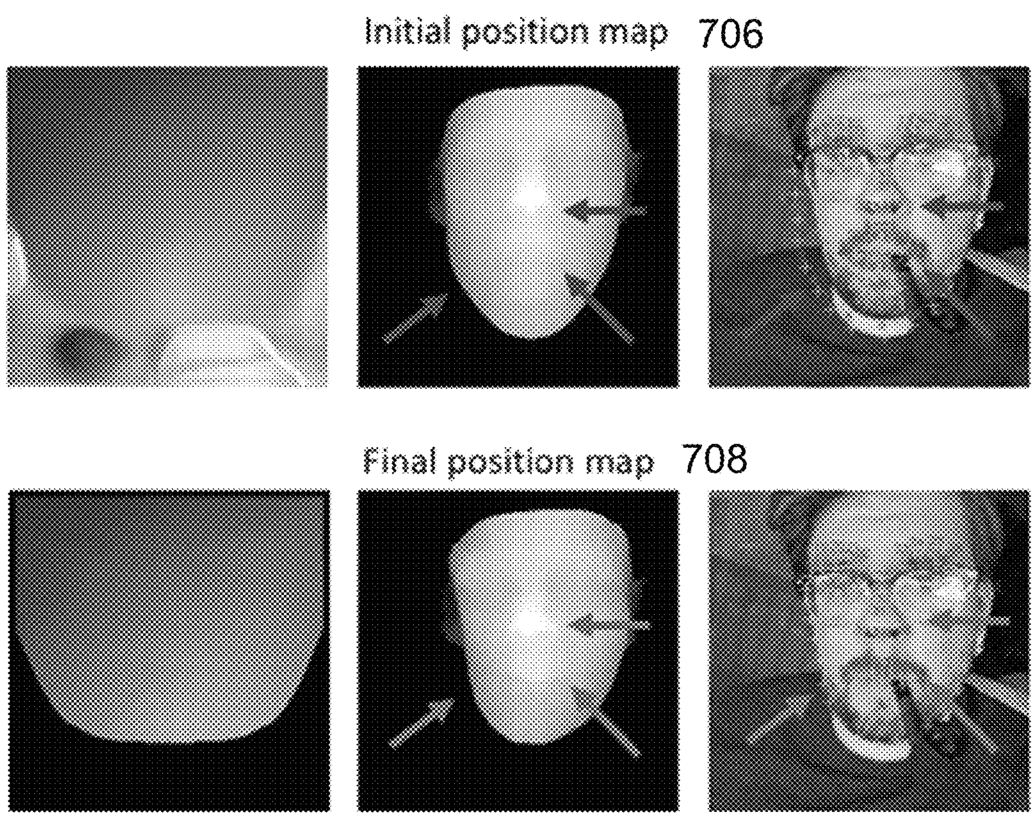

FIGS. 7A and 7B illustrate some exemplary comparisons of the final position map against the initial coarse position map in accordance with some implementations of the present disclosure. In one example in FIG. 7A, the nose in the initial position map and its related 3D model and keypoints 702 is incorrect that completely cannot reflect the person's facial features (highlighted by the arrow), but after applying the methods described herein the nose is well aligned with image in the final position map and its related 3D model and keypoints 704 (highlighted by the arrow). In the second example in FIG. 7B, there are multiple inaccuracies in the initial position map and its related 3D model and keypoints 706 like the face contour, opening mouth, and nose shape mismatch (indicated by arrows). In the final position map and its related 3D model and keypoints 708, all these errors are fixed (indicated by arrows).

Hairstyle and eyeglass classification are important for mobile game application for face avatar creation process. In some embodiments, multi-task learning and transfer learning based solutions are implemented herein to solve these problems.

In some embodiments, four different classification tasks (heads) are implemented for female hair prediction. The classification categories and parameters are shown below:

classification head 1: curve straight (0); curve (1)

classification head 2: length short (0); long (1)

classification head 3: bang no bang or split (0); left split (1); right split (2); M shape (3); straight bang (4);

natural bang (5); air bang (6)

classification head 4: braid single braid (0); two or more braid (1); single bun (2); two or more buns (3);

others (4).

In some embodiments, three different classification tasks (heads) are implemented for male hair prediction. The classification categories and parameters are shown below:

classification head 1: extreme short (0), curly (1), other (2)

classification head 2: no bang (0), split bang (1), natural bang (2)

classification head 3: split bang left (0), and split bang right (1)

In some embodiments, eyeglass classification is a binary classification task. The classification parameters are shown below:

without eyeglasses (0); with eyeglasses (1).

Among different deep learning image classification models, those achieving the state-of-the-art accuracy in ImageNet usually have large model size and complicated structures such as EfficientNet, noisy student, and FixRes. When deciding which architecture to use as a base network for feature extractor, both the prediction accuracy and model size have to be balanced. In practice, the 1% classification accuracy improvement may not bring obvious change to the end users, but the model size may increase exponentially.

Given that the trained model may need to be deployed in the client side, smaller base network can make it flexible to be deployed at both the server and client sides. Therefore, MobileNetV2 is adopted, for example, as the base network to do transfer learning for different classification heads. The MobileNetV2 architecture is based on an inverted residual structure where the input and output of the residual block are thin bottleneck layers opposite to traditional residual models which use expanded representations in the input. An MobileNetV2 uses lightweight depthwise convolutions to filter features in the intermediate expansion layer.

Figure 8A:
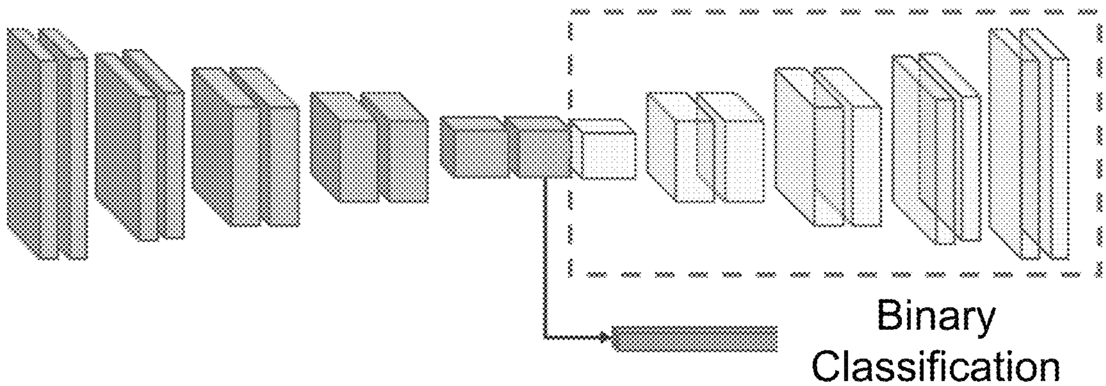
FIG. 8A is a diagram illustrating an exemplary eyeglass classification network structure in accordance with some implementations of the present disclosure.
Figure 8B:
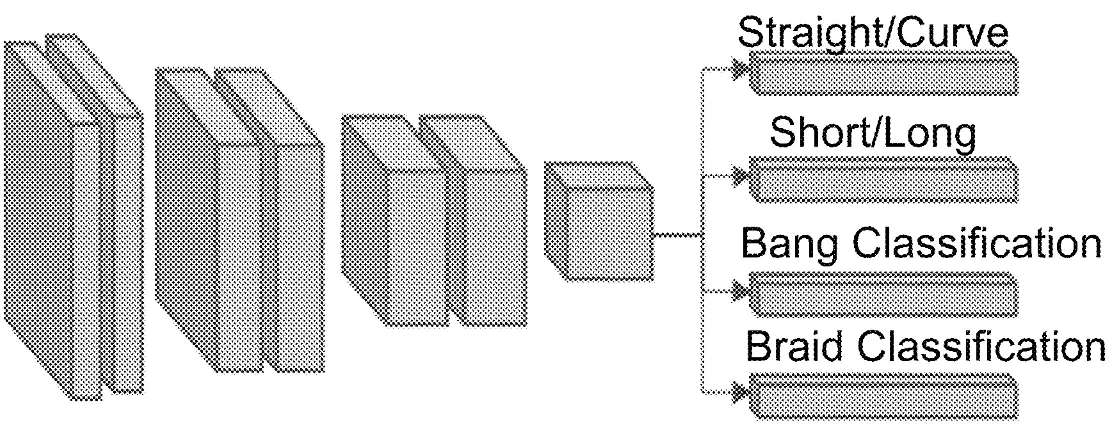
FIG. 8B is a diagram illustrating an exemplary female hair prediction network structure in accordance with some implementations of the present disclosure.
Figure 8C:
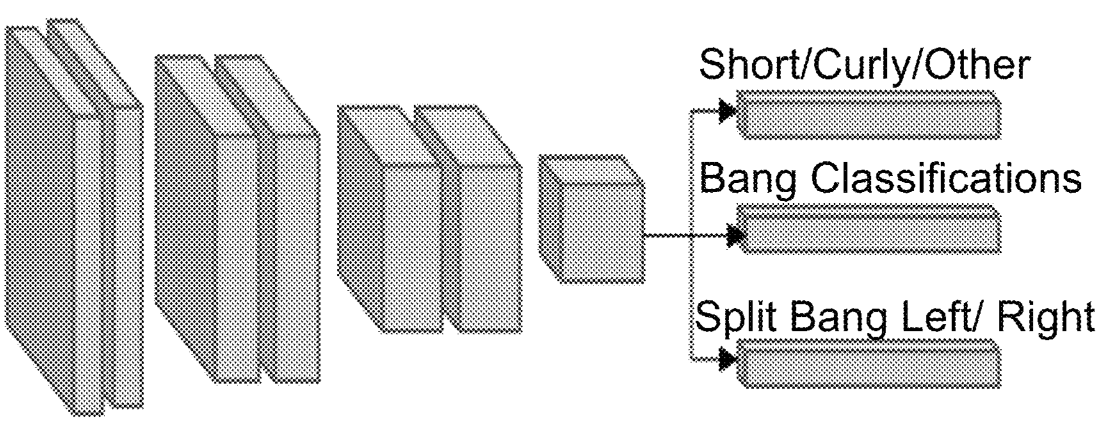
FIG. 8C is a diagram illustrating an exemplary male hair prediction network structure in accordance with some implementations of the present disclosure.

For eyeglass classification, multi-task learning approach is used. Reusing the network of keypoint prediction as the base network and freezing the parameters, in the bottleneck layer of the U-shape based network, the feature vector with cross entropy loss is used to train a binary classifier. FIG. 8A is a diagram illustrating an exemplary eyeglass classification network structure in accordance with some implementations of the present disclosure. FIG. 8B is a diagram illustrating an exemplary female hair prediction network structure in accordance with some implementations of the present disclosure. FIG. 8C is a diagram illustrating an exemplary male hair prediction network structure in accordance with some implementations of the present disclosure.

Figure 9A:
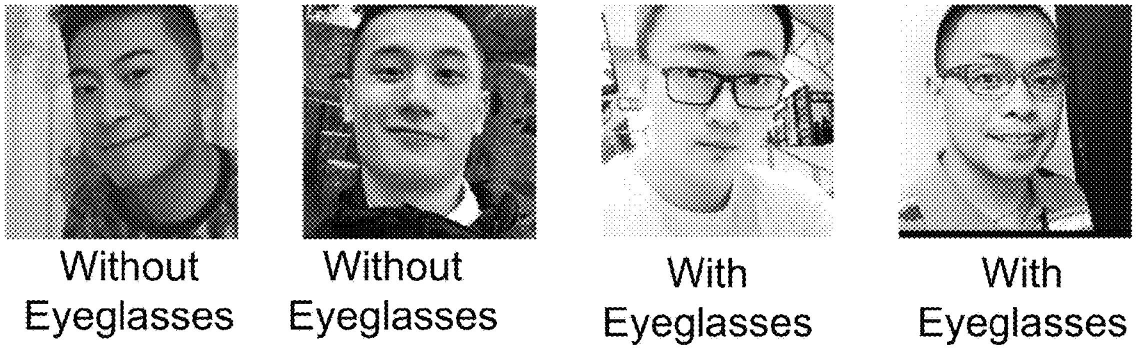
FIG. 9A illustrates some exemplary eyeglass classification prediction results in accordance with some implementations of the present disclosure.
Figure 9B:
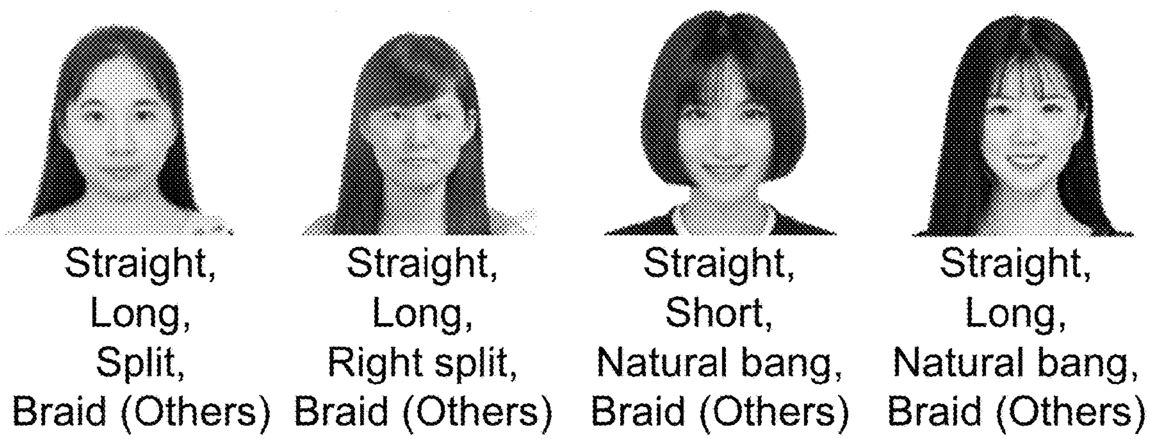
FIG. 9B illustrates some exemplary female hair prediction results in accordance with some implementations of the present disclosure.
Figure 9C:
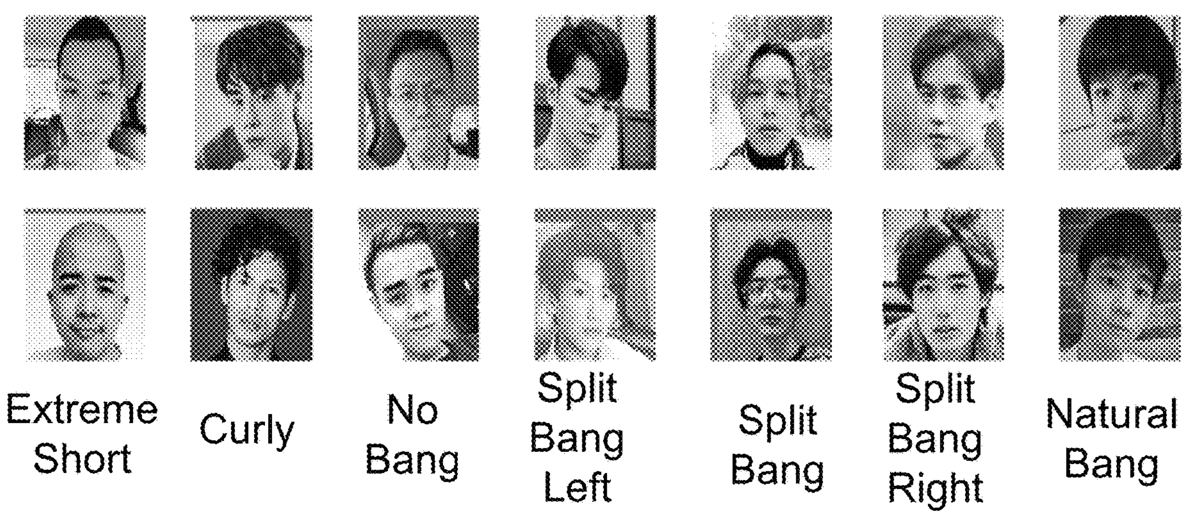
FIG. 9C illustrates some exemplary male hair prediction results in accordance with some implementations of the present disclosure.

FIG. 9A illustrates some exemplary eyeglass classification prediction results in accordance with some implementations of the present disclosure. FIG. 9B illustrates some exemplary female hair prediction results in accordance with some implementations of the present disclosure. FIG. 9C illustrates some exemplary male hair prediction results in accordance with some implementations of the present disclosure.

Figure 10:
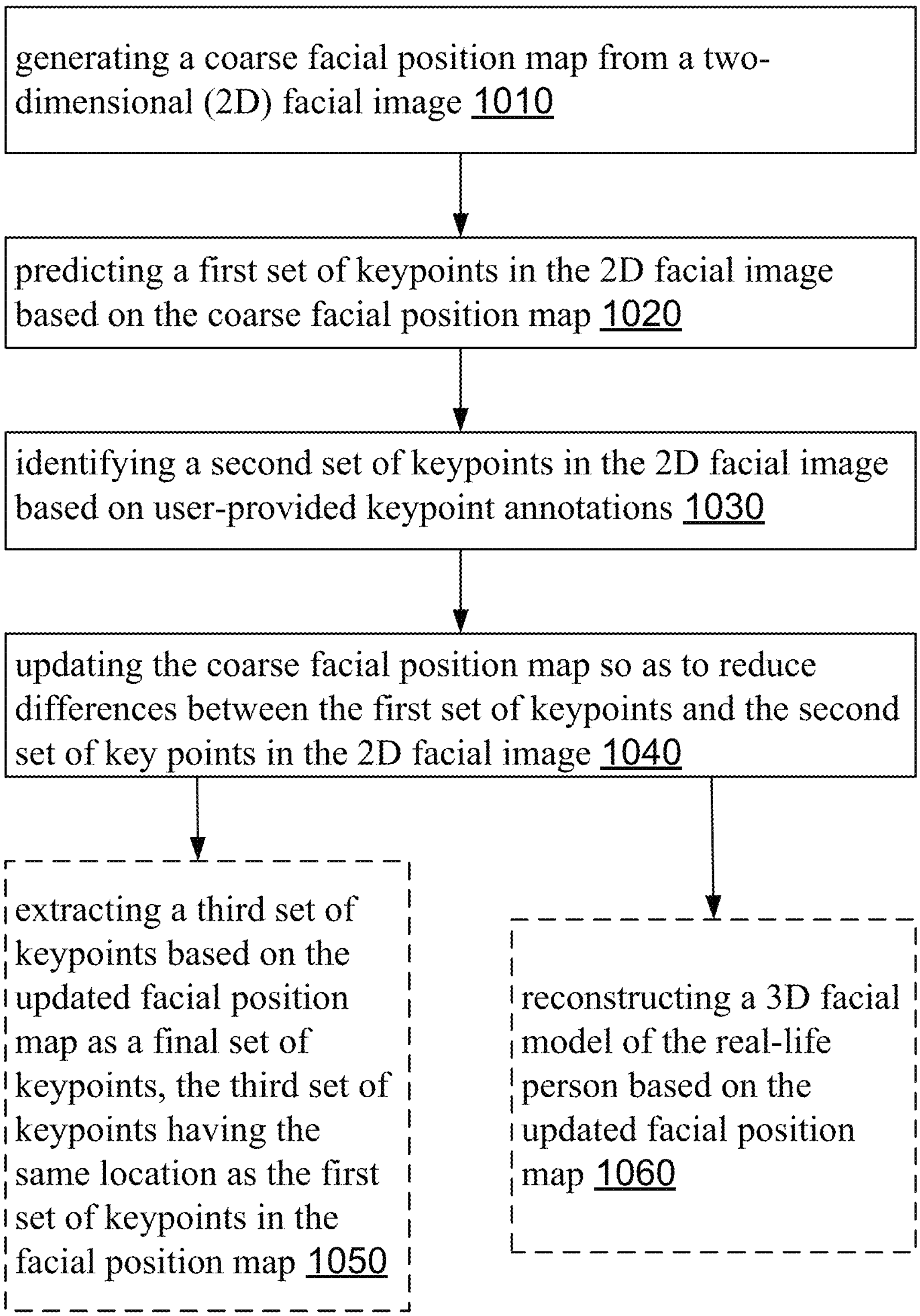
FIG. 10 is a flowchart illustrating an exemplary process of constructing a facial position map from a 2D facial image of a real-life person in accordance with some implementations of the present disclosure.

FIG. 10 is a flowchart 1000 illustrating an exemplary process of constructing a facial position map from a 2D facial image of a real-life person in accordance with some implementations of the present disclosure.

The process of constructing a facial position map includes a step 1010 of generating a coarse facial position map from the 2D facial image.

The process also includes a step 1020 of predicting the first set of keypoints in the 2D facial image based on the coarse facial position map.

The process additionally includes a step 1030 of identifying the second set of keypoints in the 2D facial image based on the user-provided keypoint annotations.

The process additionally includes a step 1040 of updating the coarse facial position map so as to reduce the differences between the first set of keypoints and the second set of key points in the 2D facial image.

In one implementation, the process further includes a step 1050 of extracting a third set of keypoints based on the updated facial position map/final position map as the final set of keypoints, and the third set of keypoints have the same location as the first set of keypoints in the facial position map. In some embodiments, the location of a keypoint in the facial position map is represented by a 2D coordinate of the array element in the position map.

In one implementation, alternative or additional to the step 1050, the process further includes a step 1060 of reconstructing a 3D facial model of the real-life person based on the updated facial position map. In one example, the 3D facial model is a 3D depth model.

Additional implementations may include one or more of the following features.

In some embodiments, the step 1040 of updating may include: transforming the coarse facial position map to a transformed facial position map, and refining the transformed facial position map.

In some embodiments, transforming includes: from learning the differences between the first set of keypoints and the second set of keypoints, estimating a transformation mapping from the coarse facial position map to the transformed facial position map; and applying the transformation mapping to the coarse facial position map.

In some embodiments, refining includes: in accordance with a determination that the 2D facial image is tilted, adjusting the keypoints corresponding to the transformed facial position map at an occluded side of the face contour to cover the whole face area.

In some embodiments, the first set of keypoints may include 96 keypoints.

In some embodiments, the process of constructing a facial position map may include a facial feature classification.

In some embodiments, the facial feature classification is via a deep learning method.

In some embodiments, the facial feature classification is via a multi-task learning or transfer learning method.

In some embodiments, the facial feature classification includes a hair prediction classification.

In some embodiments, the hair prediction classification includes a female hair prediction with a plurality of classification tasks that may include: curve, length, bang, and braid.

In some embodiments, the hair prediction classification includes a male hair prediction with a plurality of classification tasks that may include: curve/length, bang, and hair split.

In some embodiments, the facial feature classification includes an eyeglass prediction classification. The eyeglass prediction classification includes classification tasks that may include: with eyeglasses, and without eyeglasses.

The method and system disclosed herein can generate accurate 3D facial model (i.e., position map) based on 2D keypoints annotation for 3D ground-truth generation. The approach not only avoids using BFM and SFM facial models but also better preserves the detailed facial features, preventing the loss of these important features caused by the face model based methods.

Other than providing keypoints, deep learning based solutions to provide complementary facial features like hairstyle and eyeglasses are used, which are essential to personalize the face avatar based on user input face image.

While hairstyle and eyeglass predictions for facial feature classification are disclosed as examples herein, the framework is not limited to these example tasks. The framework and the solution are based on multi-task learning and transfer learning, which means it is easy to extend the framework to include other facial features such as female makeup type classification, male beard type classification, and with or without mask classification. The design of the framework is well suited to be extended to more tasks based on the requirements of various computers or mobile games.

In some embodiments, a light weighted color extraction method based on keypoints is introduced herein. The light weighted image processing algorithms estimate local pixels rapidly without segmentation of all pixels, leading to a higher efficiency.

During a training process, users do not need to have pixel-level labels, but only label a few keypoints, such as eye corners, mouth borders, and eyebrow.

Figure 11:
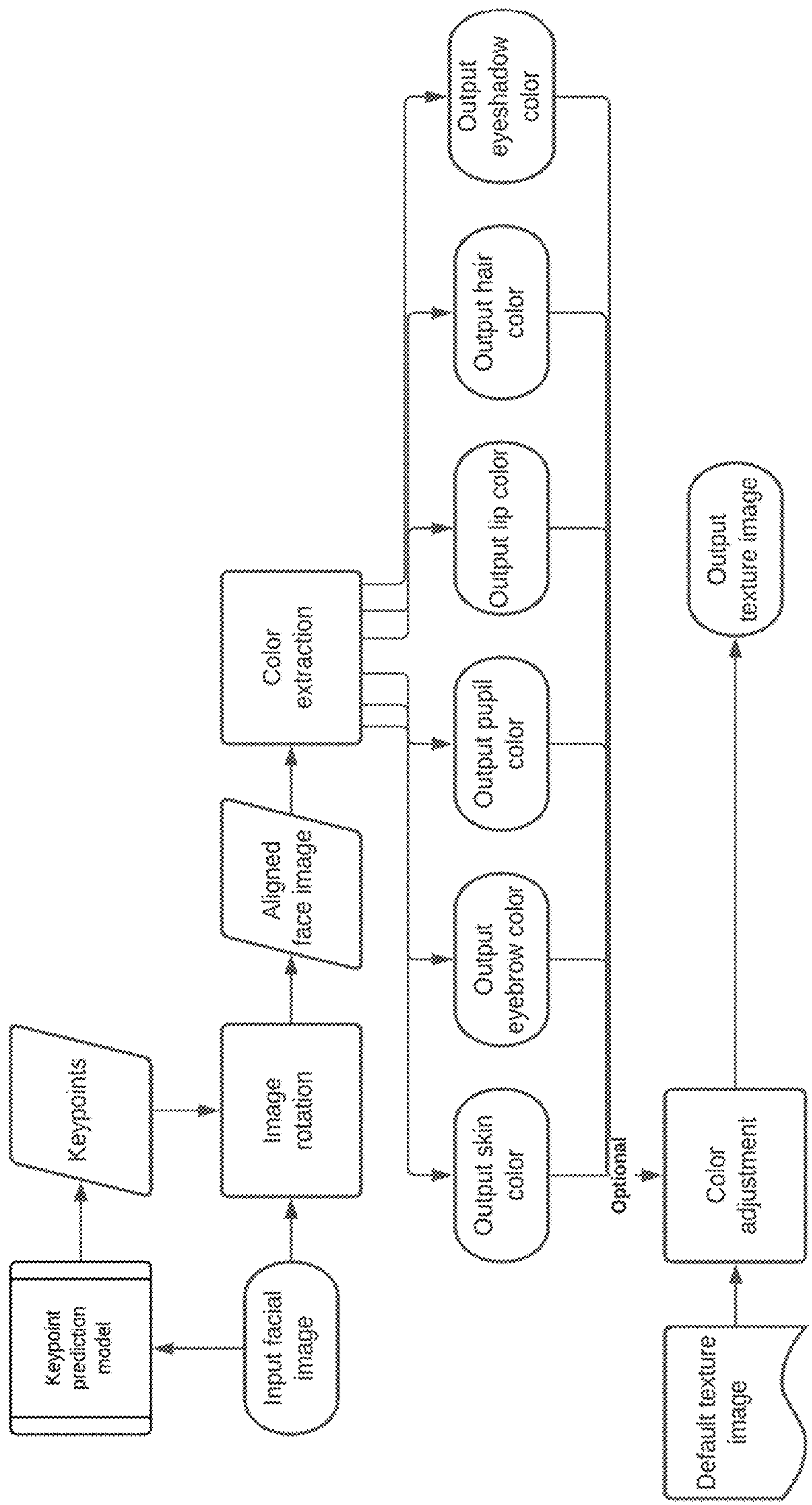
FIG. 11 is a flow diagram illustrating an exemplary color extraction and adjustment process in accordance with some implementations of the present disclosure.

The light weighted color extraction method disclosed herein can be used in personalized face generation systems for various games. In order to provide more free personalized character generation, many games have begun to adopt free adjustment methods. In addition to adjusting the shape of the face, users can also choose different color combinations. For aesthetic purposes, faces in games often use pre-defined textures instead of real face textures. This method and system disclosed herein allows the user to automatically extract the average color of each part of the face only by uploading a photo. And at the same time, the system can automatically modify the texture according to the extracted color, so that each part of the personalized face is generated closer to the real color in the user photo, improving the user experience. For example, if the user's skin tone is darker than the average skin tone of most people, the skin tone of the characters in the game will be darkened accordingly. FIG. 11 is a flow diagram illustrating an exemplary color extraction and adjustment process in accordance with some implementations of the present disclosure.

In order to locate various parts of the face, keypoints are defined for the main feature parts of the face, as shown in FIG. 1 described above. The algorithm described above is used for keypoint prediction. Different from the semantic segmentation method, keypoints are only predicted in the image without a need to classify each pixel, so that the cost of the prediction and the labeling of the training data are greatly reduced. With these keypoints, various parts of the face can be roughly located.

Figure 12:
FIG. 12 illustrates an exemplary skin color extraction method in accordance with some implementations of the present disclosure.

FIG. 12 illustrates an exemplary skin color extraction method in accordance with some implementations of the present disclosure. In order to extract the features in the image, it is necessary to rotate the face area in the original image 1202 so that the keypoints 1 and 17 on the left and right sides of the face are aligned, as shown in image after rogation alignment 1204.

Next, the area for skin tone pixel inspection is determined. The bottom coordinates of the keypoints of the eye are selected as the upper boundary of the detection area, the bottom keypoints of the nose are selected as the lower boundaries of the detection area, the left and right boundaries are determined by the face border keypoints. In this way, the skin color detection area is obtained as shown in the area 1208 on image 1206.

Not all pixels in this area 1208 are skin pixels, and the pixels may also include some eyelashes, nostrils, nasolabial folds, hair, etc. Therefore, the median values of the R, G, B values of all pixels in this area are selected as the final predicted average skin color.

Figure 13:
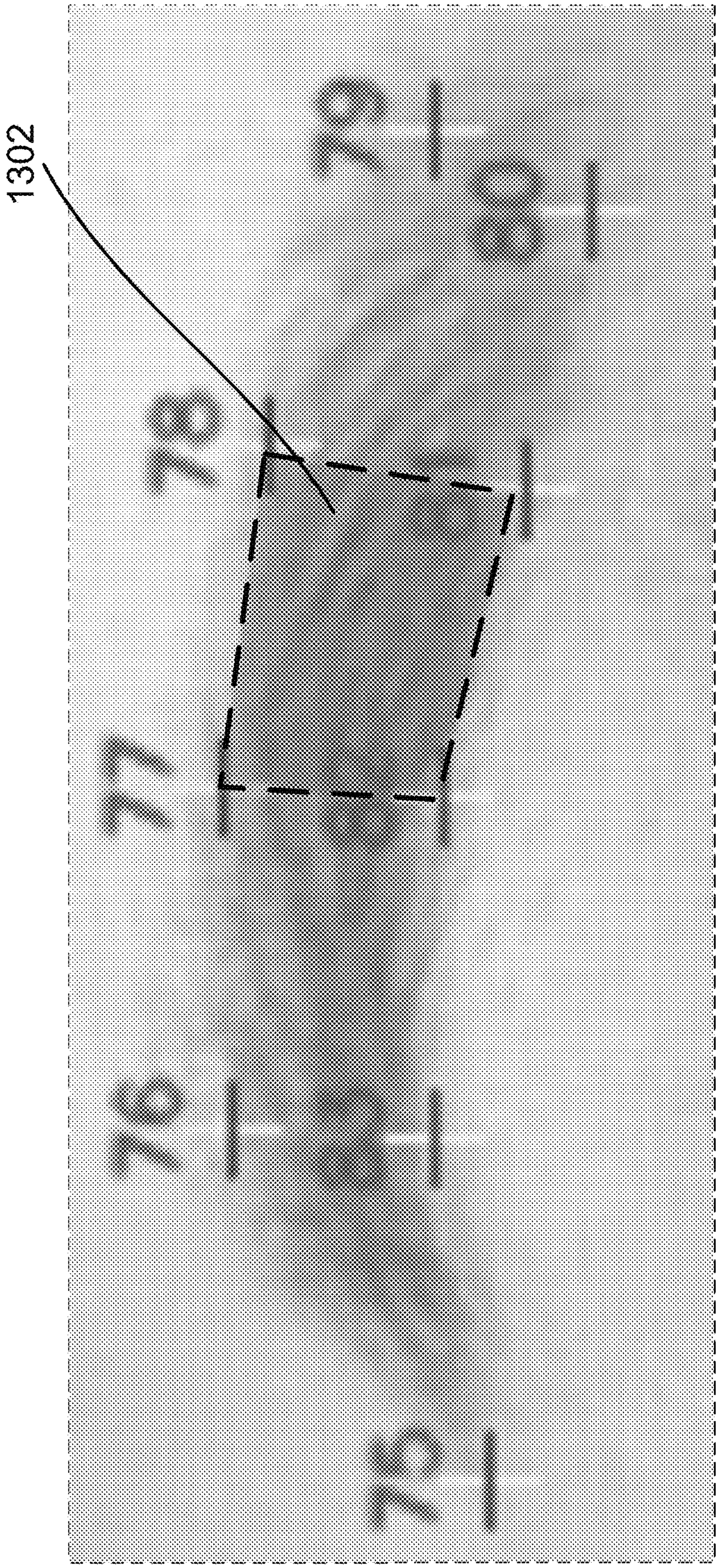
FIG. 13 illustrates an exemplary eyebrow color extraction method in accordance with some implementations of the present disclosure.

FIG. 13 illustrates an exemplary eyebrow color extraction method in accordance with some implementations of the present disclosure. For the average color of the eyebrows, the main eyebrow is first selected, that is the eyebrow on the side closer to the lens as the target. In some embodiments, if both eyebrows are the main eyebrows, the eyebrow pixels on both sides are extracted. Assuming that the left eyebrow is the main eyebrow, as shown in FIG. 13, the quadrilateral area composed of keypoints 77, 78, 81, and 82 is selected as the eyebrow pixel search area. This is because the eyebrows close to the outside are too thin, and the impact of small keypoint errors will be magnified. Because the eyebrows close to the inside may often be sparse and mixed with the skin color, the middle eyebrow area 1302 is selected to collect pixels. And each pixel must be compared with the average skin color first, and only pixels with a difference greater than a certain threshold will be collected. Finally, similar to skin color, the median R, G, B values of the collected pixels are chosen as the final average eyebrow color.

Figure 14:
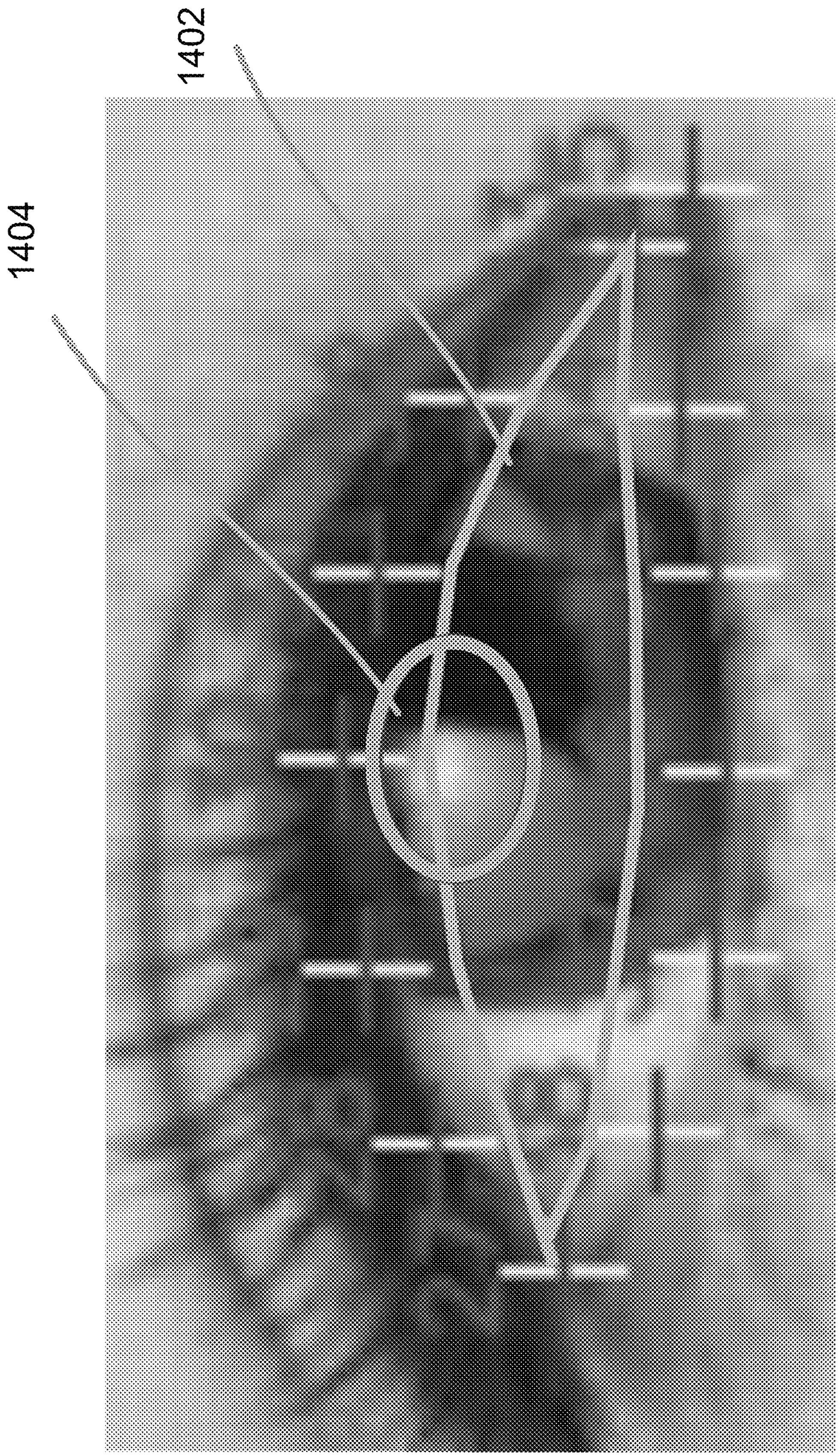
FIG. 14 illustrates an exemplary pupil color extraction method in accordance with some implementations of the present disclosure.

FIG. 14 illustrates an exemplary pupil color extraction method in accordance with some implementations of the present disclosure. Similar to the eyebrow color extraction, when extracting the pupil color, the side of the main eye close to the lens is first selected. In some embodiments, if both eyes are the main eyes, the pixels on both sides are collected together. In addition to the pupil itself, the enclosed area contained inside the keypoints of the eye may also contain eyelashes, whites of the eyes, and reflections. These should be removed as much as possible in the process of pixel collection to ensure that most of the final pixels come from the pupil itself.

In order to remove the eyelash pixels, the keypoints of the eyes are shrunk inward for a certain distance along the y-axis (vertical direction of the FIG. 14) to form the area 1402 shown in FIG. 14. In order to remove the white eyes and reflections (as shown by the circle 1404 in FIG. 14), such pixels are further excluded in this area 1402. For example, if the R, G, and B values of a pixel are all greater than a predefined threshold, then that pixel is excluded. The pixels collected in this way can ensure that most of them come from the pupil itself. Similarly, the median color is used as the average pupil color.

In some embodiments, for lip color extraction, only detect pixels in the lower lip area are detected. The upper lip is often thin and relatively sensitive to key point errors, and because the upper lip is light in color, it cannot represent the lip color well. Therefore, after rotating and correcting the photo, all the pixels in the area surrounded by the key points of the lower lip are collected, and the median color to represent the average lip color is used.

Figure 15:
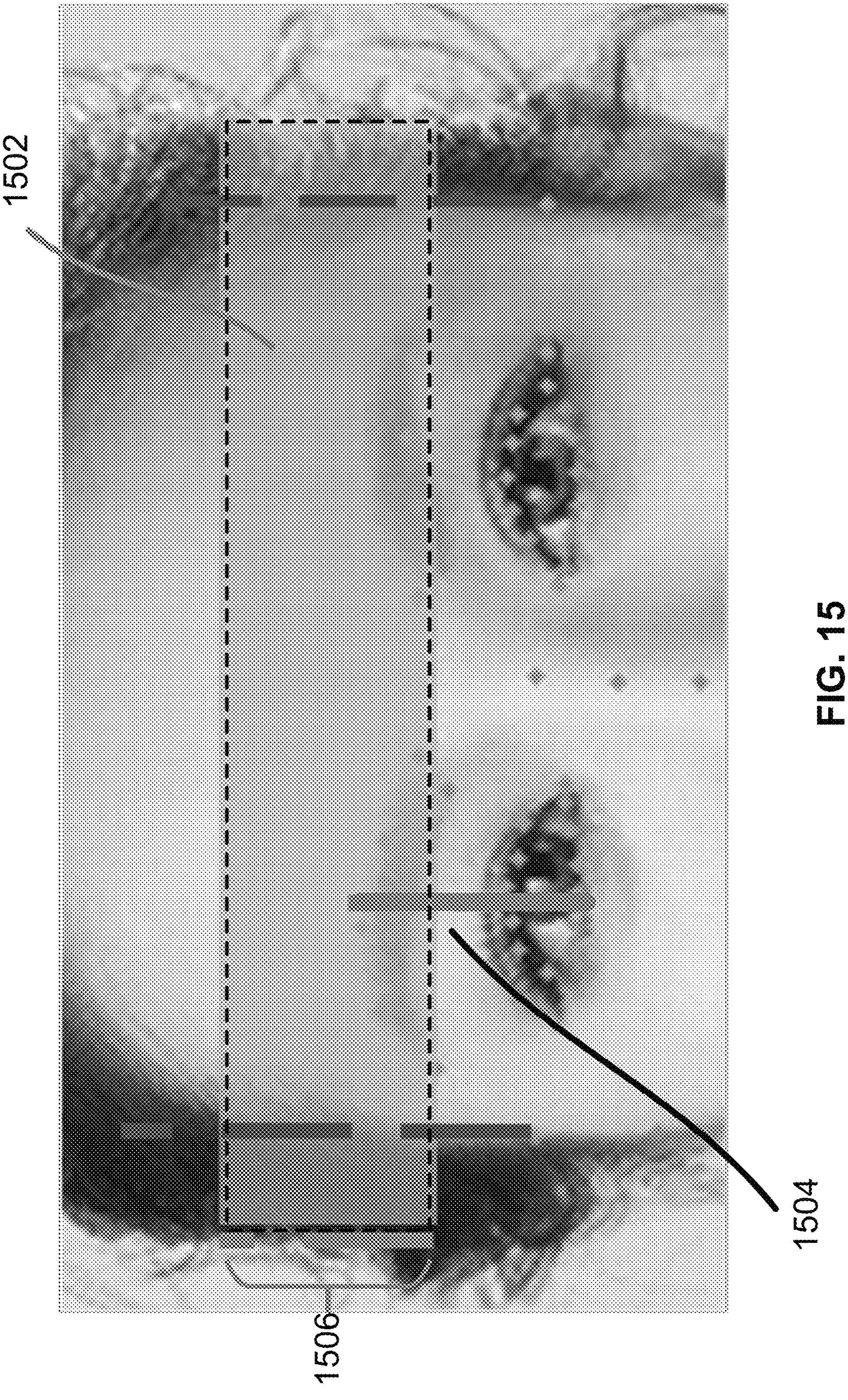
FIG. 15 illustrates an exemplary hair color extraction region used in a hair color extraction method in accordance with some implementations of the present disclosure.

FIG. 15 illustrates an exemplary hair color extraction region used in a hair color extraction method in accordance with some implementations of the present disclosure. Hair color extraction is more difficult than the previous parts. The main reason is that each person's hairstyle is unique, and the background of the photo is complex and diverse. Therefore, it is difficult to locate the pixels of the hair. In one way to find hair pixels accurately, neural networks are used to segment the hair pixels of the image. Since the annotation cost of image segmentation is very high, and a very high-accuracy color extraction is not needed for game applications, a method based on the approximate prediction of key points is used.

In order to obtain hair pixels, the detection area is first determined. As shown in FIG. 15, the detection area 1502 is a rectangle. The lower boundary is the eyebrow corners on both sides, and the height (vertical line 1504) is the distance 1506 from the upper edge of the eyebrows to the lower edge of the eye. The left and right are the key points 1, 17 to extend the fixed distance to the left and right respectively. The hair pixel detection area 1502 thus obtained is shown in FIG. 15.

Figure 16:
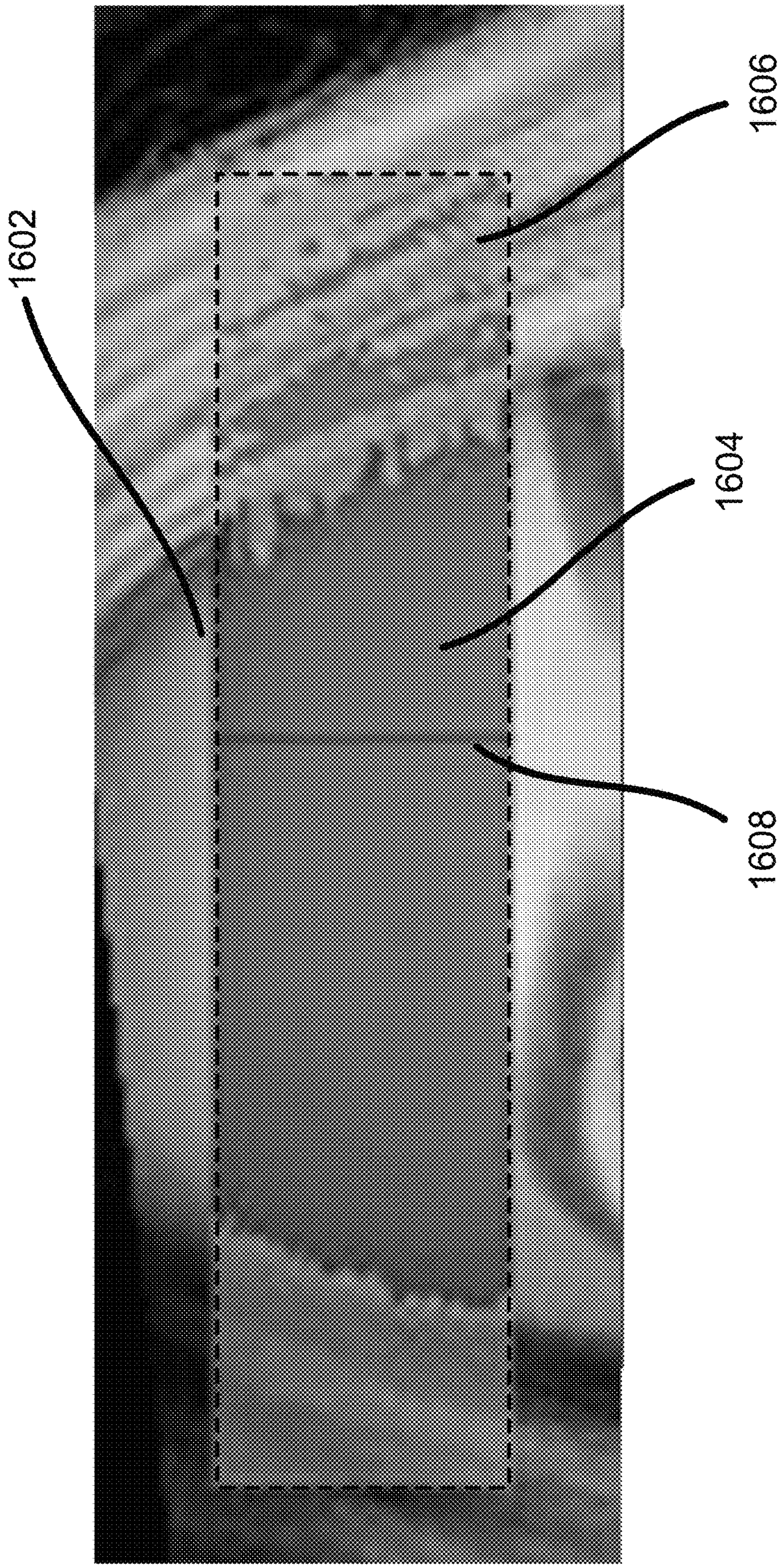
FIG. 16 illustrates an exemplary separation between hair pixels and skin pixels within the hair color extraction region in accordance with some implementations of the present disclosure.

FIG. 16 illustrates an exemplary separation between hair pixels and skin pixels within the hair color extraction region in accordance with some implementations of the present disclosure. Generally, the detection area contains three types of pixels: skin, hair, and background. In some more complicated cases, it also includes headwear. Because the left and right range of our detection area is relatively conservative, the included hair pixels are assumed to be far more than background pixels in most cases. Therefore, the main process is to divide the pixels of the detection area into hair or skin.

For each line of pixels in the detection area, the skin color changes are often continuous, for example, from light to dark, and the skin color and the hair junction often have obvious changes. Therefore, the middle pixel of each row is selected as the starting point 1608, and skin pixels are detected to the left and right sides. First, a relatively conservative threshold is used to find a more reliable skin color pixel, and then it is expanded left and right. If the color of the neighboring pixels is relatively close, it is also marked as skin color. Such a method takes into account the gradation of skin color, and can obtain relatively accurate results. As shown in FIG. 16, within the hair color extraction region 1602, the darker areas such as 1604 represent skin-color pixels, and the lighter areas such as 1606 represent hair color pixels. The median R, G, B values of the collected hair color pixels within the hair color region are chosen as the final average hair color.

Figure 17:
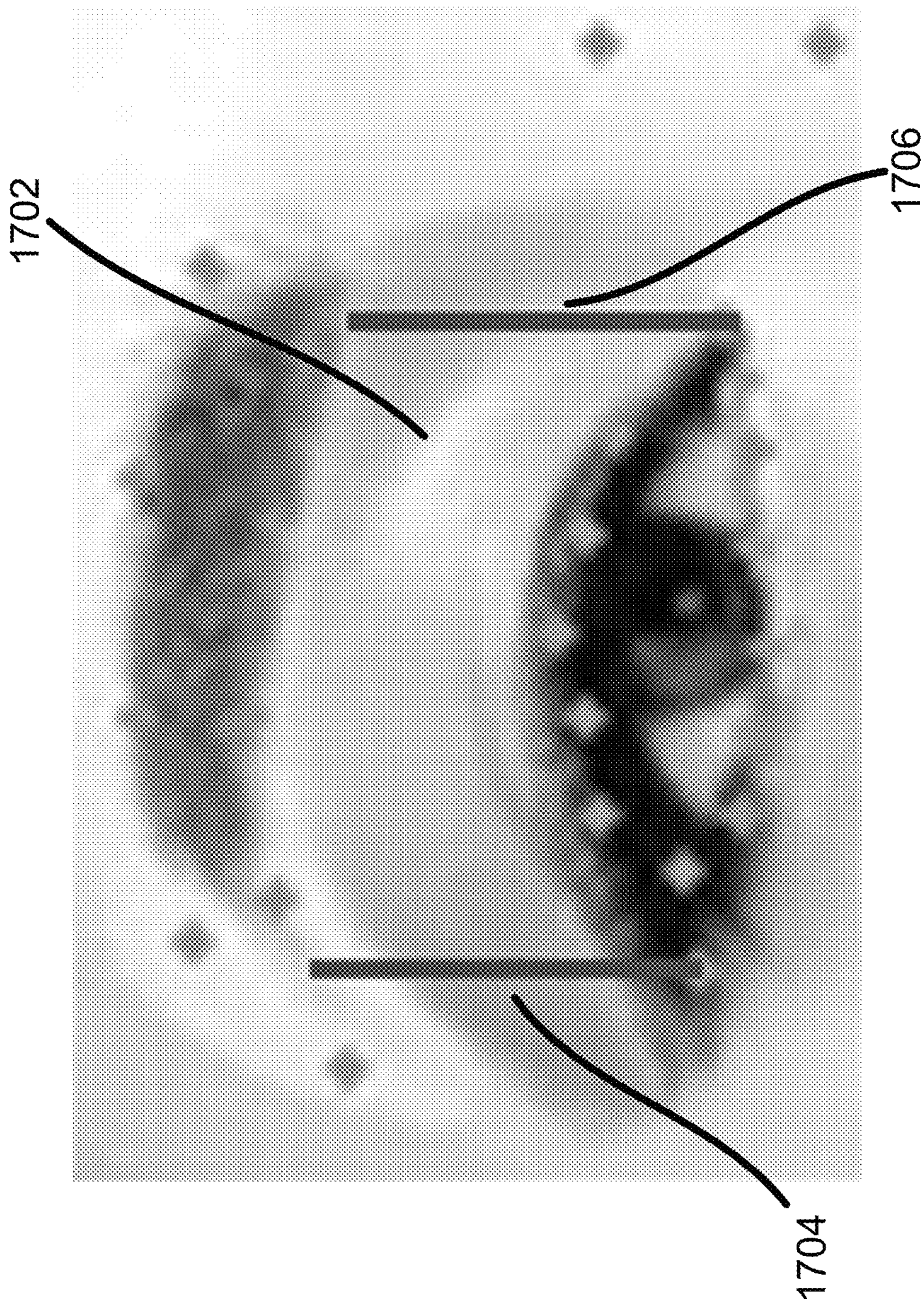
FIG. 17 illustrates an exemplary eyeshadow color extraction method in accordance with some implementations of the present disclosure.

FIG. 17 illustrates an exemplary eyeshadow color extraction method in accordance with some implementations of the present disclosure. The extraction of eye shadow color is a little different from the previous parts. This is because eye shadow is a makeup that may or may not exist. So, when extracting the eye shadow color, whether the eye shadow exists needs to be first determined, and if it exists, its average color is extracted. Similar to the color extraction of eyebrows and pupils, eye shadow color extraction is only performed on the part of the main eye that is close to the lens.

First, which pixels belong to the eyeshadow has to be determined. For the detection area of eyeshadow pixels, the area 1702 within lines 1704 and 1706 is used as shown in FIG. 17. The left and right sides of the area 1702 are defined as the inner and outer corners of the eyes, and the upper and lower sides of the area are the lower edge of the eyebrows and the upper edge of the eyes. In addition to possible eyeshadow pixels in this area 1702, there may also eyelashes, eyebrows, and skin, which need to be excluded when extracting the eyeshadow.

In some embodiments, in order to eliminate the influence of eyebrows, the upper edge of the detection area is further moved down. In order to reduce the impact of eyelashes, pixels with brightness below a certain threshold are excluded. In order to distinguish the eye shadow from the skin color, the difference between the hue of each pixel and the average skin hue is checked. Only when the difference is greater than a certain threshold, the pixel is collected as a possible eyeshadow pixel. The reason why hue is used instead of RGB value is that the average skin color is collected mainly under the eyes, and the skin color above the eyes may have large changes in brightness. Since color is not sensitive to brightness, color is relatively stable. As a result, hue is more suitable for judging whether a pixel is skin.

Through the above process, whether the pixels in each detection area belong to the eyeshadow can be determined. In some embodiments, if there is no eyeshadow, errors may occur that some pixels may still be recognized as eyeshadow.

In order to reduce the above errors, each column of the detection area is checked. If the number of eyeshadow pixels in the current column is greater than a certain threshold, then the current column is marked as an eyeshadow column. If the ratio of the eyeshadow columns to the width of the detection area is greater than a certain threshold, it is considered that there is an eye shadow in the current image, and the median color of the collected eyeshadow pixels is used as the final color. In this way, the few pixels that are misclassified as eyeshadows will not cause a wrong judgment on the overall eyeshadow.

Considering art style, most games often do not allow all the above parts to be freely adjusted in color. For the part where color adjustment is open, it is often only allowed to match a set of predefined colors. Taking hair as an example, if a hairstyle allows five hair colors to be selected, the hairstyle in the resource pack will contain texture images corresponding to each hair color. During detection, as long as the texture image with the closest color is selected according to the hair color prediction result, the desired hair rendering effect can be obtained.

In some embodiments, when only one color texture image is provided, the color of the texture image can be reasonably changed according to any color detected. In order to facilitate the color conversion, the commonly used RGB color space representation is converted to the HSV color model. The HSV color model consists of three dimensions: hue H, saturation S and lightness V. The hue H is expressed in the model as a color range of 360 degrees, with red being 0 degrees, green being 120 degrees, and blue being 240 degrees. Saturation S represents the mixture of spectral colors and white. The higher the saturation, the brighter the color. When the saturation approaches 0, the color approaches white. The lightness V represents the brightness of the color, and the value range is from black to white. After the color adjustment, the HSV median value of the texture image is expected to match the predicted color. Therefore, the hue value calculation of each pixel can be expressed as follows: $H_i' = (H_i + H' - H)\ \%1$, where $H_i'$ and $H_i$ represent the hue of pixel i before and after the adjustment, and H and H' represent the median value of the hue of the texture image before and after the adjustment.

Unlike hue, which is a continuous space that is connected end to end, saturation and lightness have boundary singularities like 0 and 1. If a linear processing method similar to hue adjust is used, when the median value of the initial picture or the adjusted picture is close to 0 or 1, many pixel values will appear too high or too low in saturation or brightness. The phenomenon causes unnatural colors. In order to solve this problem, the following nonlinear curve is used to fit the saturation and lightness before and after the pixel adjustment:

$$y = 1/(1 + (1-\alpha)(1-\underline{x})/(\alpha\underline{x})), \alpha \in (0,1)$$

In the above equation, x and y are the saturation or lightness value before and after the adjustment, respectively. The only uncertain parameter is α, which can be derived as $$\alpha = 1/(1 + x/(1-x) \times (1-y)/y)$$

This equation can guarantee that α falls into the interval from 0 to 1. Take the saturation as example, the initial median saturation $\underline{S}$ can be computed simply based on the input picture. And the target saturation value $S_t$ can be gained by the hair color extraction and color space conversion. Therefore, $\alpha = 1/(1 + \underline{S}/(1-\underline{S}) \times (1-S_t)/S_t)$. For each pixel $S_i$ in the default texture image, the adjusted value can then be computed by the equation: $S_i' = 1/(1 + (1-\alpha)(1-S_i)/(\alpha S_i))$. The same calculations apply to the lightness.

Figure 18:
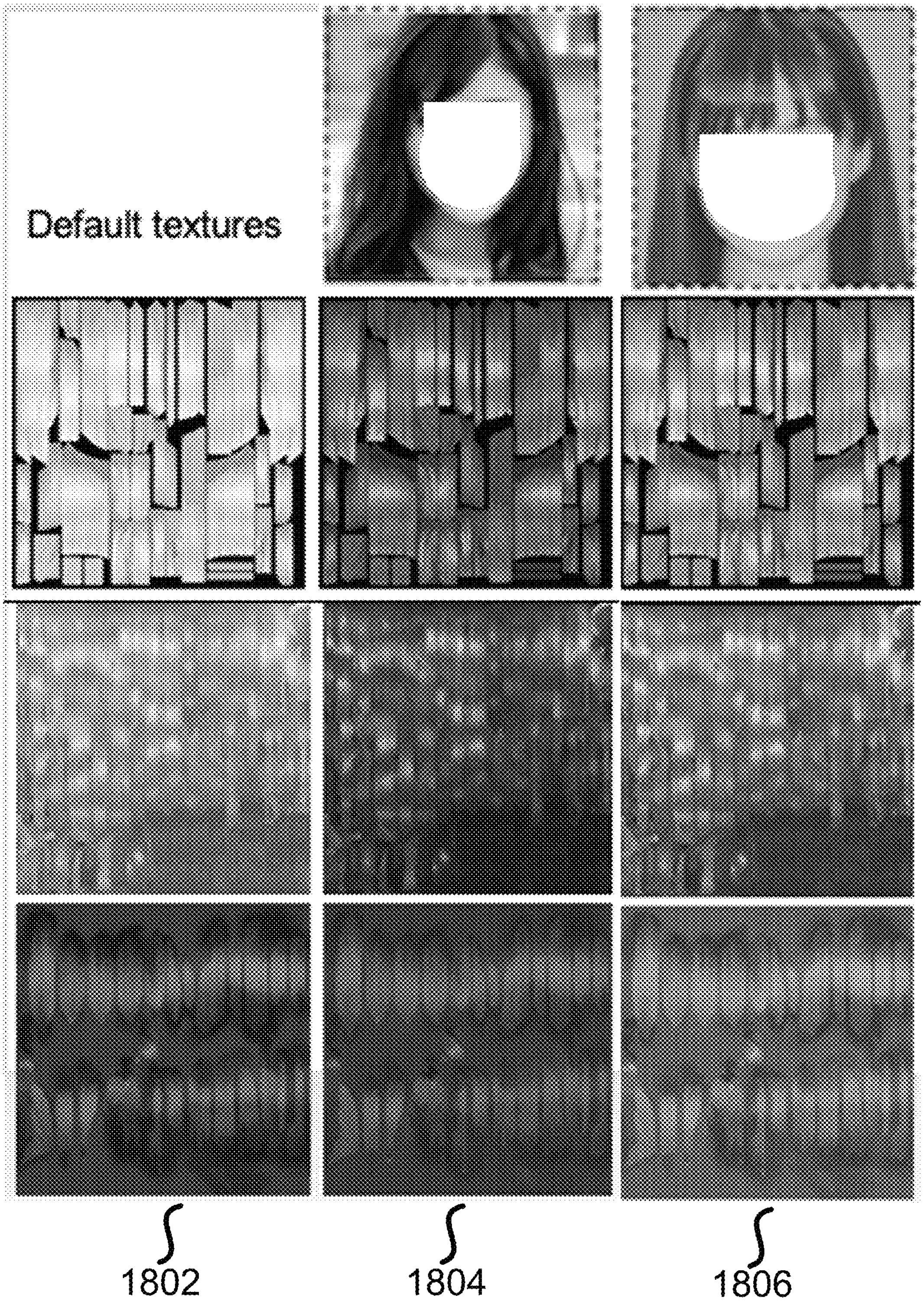
FIG. 18 illustrates some exemplary color adjustment results in accordance with some implementations of the present disclosure.

In order to make the display effect of the adjusted texture picture closer to a real picture, special processing is done for different parts. For example, in order to keep the hair low saturation, $\underline{S'} = \underline{S'} \times \underline{V'}\hat{}0.3$ is set. FIG. 18 illustrates some exemplary color adjustment results in accordance with some implementations of the present disclosure. Column 1802 illustrates some default texture picture provided by a particular game, column 1804 illustrates some texture pictures adjusted according to the real picture shown on the top of the column 1804 from the corresponding default texture picture in the same row, and column 1806 illustrates some texture pictures adjusted according to the real picture shown on the top of the column 1806 from the corresponding default texture picture in the same row.

Figure 19:
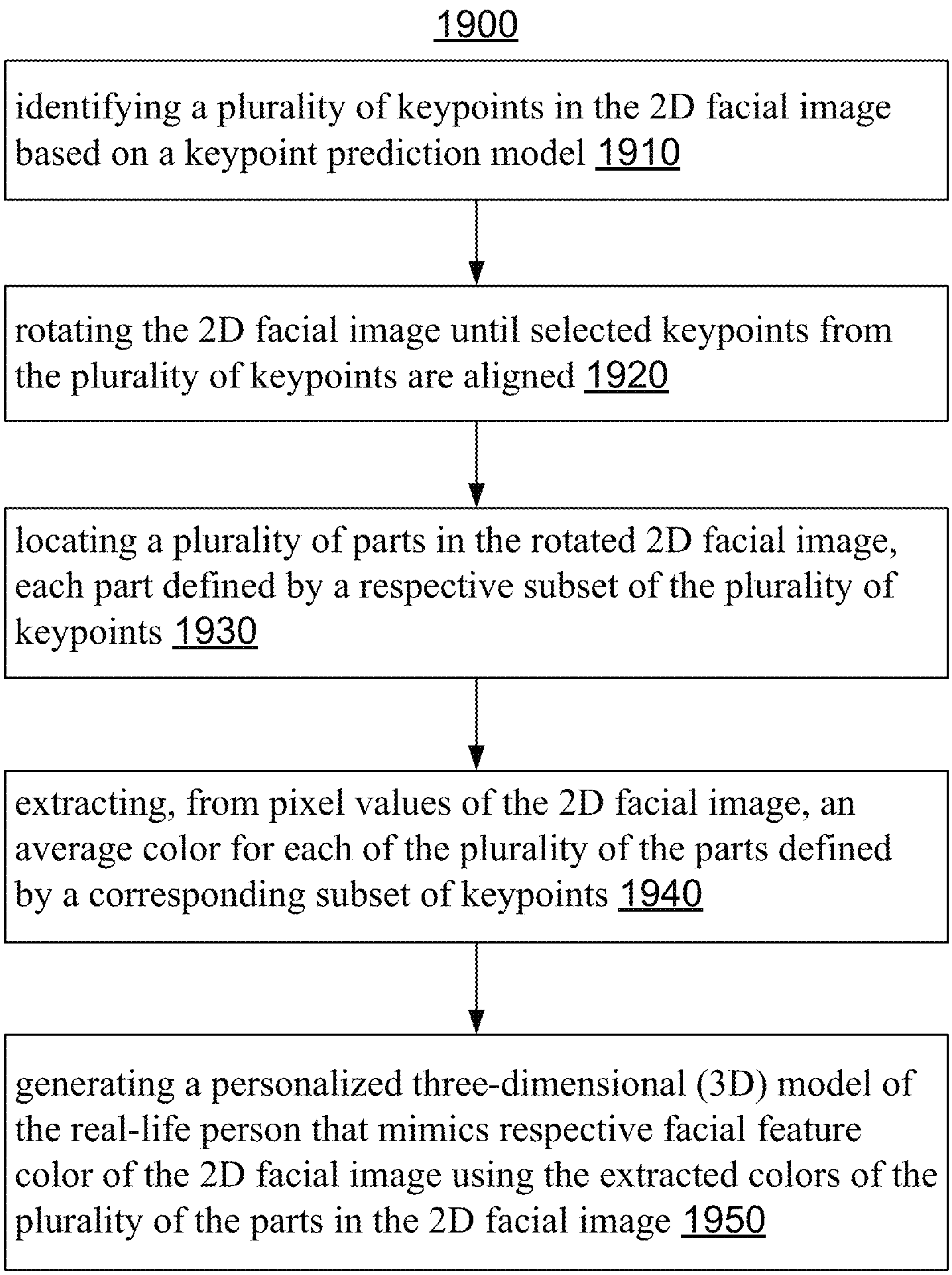
FIG. 19 is a flowchart illustrating an exemplary process of extracting color from a 2D facial image of a real-life person in accordance with some implementations of the present disclosure.

FIG. 19 is a flowchart 1900 illustrating an exemplary process of extracting color from a 2D facial image of a real-life person in accordance with some implementations of the present disclosure.

The process of extracting color from a 2D facial image of the real-life person includes a step 1910 of identifying a plurality of keypoints in the 2D facial image based on a keypoint prediction model.

The process also includes a step 1920 of rotating the 2D facial image until the selected keypoints from the plurality of keypoints are aligned;

The process additionally includes a step 1930 of locating a plurality of parts in the rotated 2D facial image, and each part is defined by a respective subset of the plurality of keypoints.

The process additionally includes a step 1940 of extracting, from the pixel values of the 2D facial image, the average color for each of the plurality of the parts defined by a corresponding subset of keypoints.

The process additionally includes a step 1950 of generating a personalized 3D model of the real-life person that mimics the respective facial feature color of the 2D facial image using the extracted colors of the plurality of the parts in the 2D facial image.

Additional implementations may include one or more of the following features.

In some embodiments, the keypoint prediction model in the step 1910 of identifying is formed based on machine learning from the user manually annotated keypoints.

In some embodiments, the selected keypoints in the step 1920 of rotating used for alignment are located on the symmetrical left and right sides of the 2D facial image.

In some embodiments, in the step 1940, extracting the average color for each of the plurality of the parts may include selecting the median of R, G, B values of all pixels in a respective defined area within a corresponding part as the predicted average color.

In some embodiments, in the step 1940, extracting the average color for each of the plurality of the parts may include determining an area for skin color extraction within a skin part, and selecting the median of R, G, B values of all pixels in the area for skin color extraction as the predicted average color of the skin part. In some embodiments, the area for skin color extraction within a skin part is determined as the area below the eyes and above the lower edge of the nose on the face.

In some embodiments, in the step 1940, extracting the average color for each of the plurality of the parts may include eyebrow color extraction within an eyebrow part that includes: in accordance with a determination that an eyebrow is on a side closer to a viewer of the 2D facial image, selecting the eyebrow as the target eyebrow; in accordance with a determination that both eyebrows are equally close to the viewer of the 2D facial image, selecting the both eyebrows as the target eyebrows; extracting the middle eyebrow area(s) within the target eyebrow(s); comparing each pixel value within the middle eyebrow area(s) with the average skin color; collecting pixels within the middle eyebrow area(s) that have the pixel value difference from the average skin color beyond a threshold; and selecting the median of R, G, B values of the collected pixels for the eyebrow color extraction as the predicted average color of the eyebrow part.

In some embodiments, in the step 1940, extracting the average color for each of the plurality of the parts may include pupil color extraction within the eye part that includes: in accordance with a determination that an eye is on a side closer to a viewer of the 2D facial image, selecting the eye as the target eye; in accordance with a determination that both eyes are equally close to the viewer of the 2D facial image, selecting the both eyes as the target eyes; extracting the area(s) within the target eye(s) without the eyelashes; comparing each pixel value within the extracted area(s) with a predetermined threshold; collecting pixels within the extracted area(s) that have a pixel value beyond the predetermined threshold; and selecting the median of R, G, B values of the collected pixels for the pupil color extraction as the predicted average color of the pupil.

In some embodiments, in the step 1940, extracting the average color for each of the plurality of the parts may include lip color extraction within the lip part that includes: collecting all pixels in the area surrounded by the keypoints of a lower lip, and selecting the median of R, G, B values of the collected pixels for the lip color extraction as the predicted average color of the lip part.

In some embodiments, in the step 1940, extracting the average color for each of the plurality of the parts may include hair color extraction within a hair part that includes: identifying the area including a part of a forehead extending into the hair part on both sides; determining a pixel color change beyond a predetermined threshold from the middle to the left boundary and right boundary of the area; dividing the area into the hair area and the skin area based on the pixel color change beyond the predetermined threshold; and selecting the median of R, G, B values of pixels for the hair area within the area as the predicted average color of the hair part.

In some embodiments, the area including the part of the forehead extending into the hair part on the both side is identified as a rectangular area with the lower boundary at both eyebrow corners, the left boundary and the right boundary at a fixed distance outward from the keypoints located on the symmetrical left and right sides of the 2D facial image, and the height at a distance from the upper edge of the eyebrow to the lower edge of an eye.

In some embodiments, in the step 1940, extracting the average color for each of the plurality of the parts may include eyeshadow color extraction within an eyeshadow part that includes: in accordance with a determination that an eye is on a side closer to a viewer of the 2D facial image, selecting the eye as the target eye; in accordance with a determination that both eyes are equally close to the viewer of the 2D facial image, selecting the both eyes as the target eyes; extracting the middle area(s) within the eyeshadow part close to the target eye(s), collecting pixels within the extracted middle area(s) with the brightness above a predetermined brightness threshold to exclude the eyelashes, and with a pixel hue value difference from the average skin hue value beyond a predetermined threshold; in accordance with a determination that the number of collected pixels in one pixel column within the extracted middle area(s) is greater than a threshold, labeling the pixel column as an eyeshadow column; and in accordance with a determination that a ratio of the eyeshadow columns to the width of the extracted middle area is greater than a certain threshold, selecting the median of R, G, B values of the collected pixels for the eyeshadow color extraction as the predicted eyeshadow color of the eyeshadow part.

In some embodiments, the process of extracting color from a 2D facial image of the real-life person may additionally include converting a texture map based on the average color while retaining the original brightness and color differences of the texture map that includes: converting the average color from the RGB color space representation to the HSV (hue, saturation, lightness) color space representation, and adjusting the color of the texture map to reduce the difference between the median HSV values of the average color and the median HSV values pixels of the texture map.

The method and systems disclosed herein can be used in applications in different scenarios, such as character modeling, and game character generation. The lightweight method can be flexibly applied to different devices, including mobile devices.

In some embodiments, the definition of the keypoints of the face in the current system and method is not limited to the current definition, and other definitions are also possible, as long as the contours of each part can be fully expressed. In addition, in some embodiments, the colors directly returned in the scheme may not be used directly, but could be matched with a predefined color list to achieve further color screening and control.

Deformation methods that optimize Laplacian operators require meshes to be differentiable manifolds. However, in practice, meshes made by gaming artists often contain artifacts like duplicated vertices, unsealed edges which would damage the property of manifolds. Therefore, methods like biharmonic deformation can only be used after meshes are carefully cleaned up. The method of affine deformation proposed herein doesn't use Laplacian operator, therefore has no such strong constraints.

The family of deformation methods represented by biharmonic deformation suffers from inadequacies of deformation abilities in some cases. Harmonic functions that solve Laplacian operator one time often cannot achieve smoothed results due to its low smoothness requirement. Poly-harmonic functions that solve high-ordered (>=3) Laplacian operator fail on many meshes due to their high requirement of being at least 6-order differentiable. In most cases, it is observed that only biharmonic deformation that solves Laplacian operator twice could deliver acceptable results. Even so, its deformation could still be unsatisfactory because of its lack of tuning freedom. Affine deformation proposed herein could achieve subtle deformation tuning by changing the smoothness parameter, and the range of its deformation results cover that of using biharmonic deformation.

Figure 20:
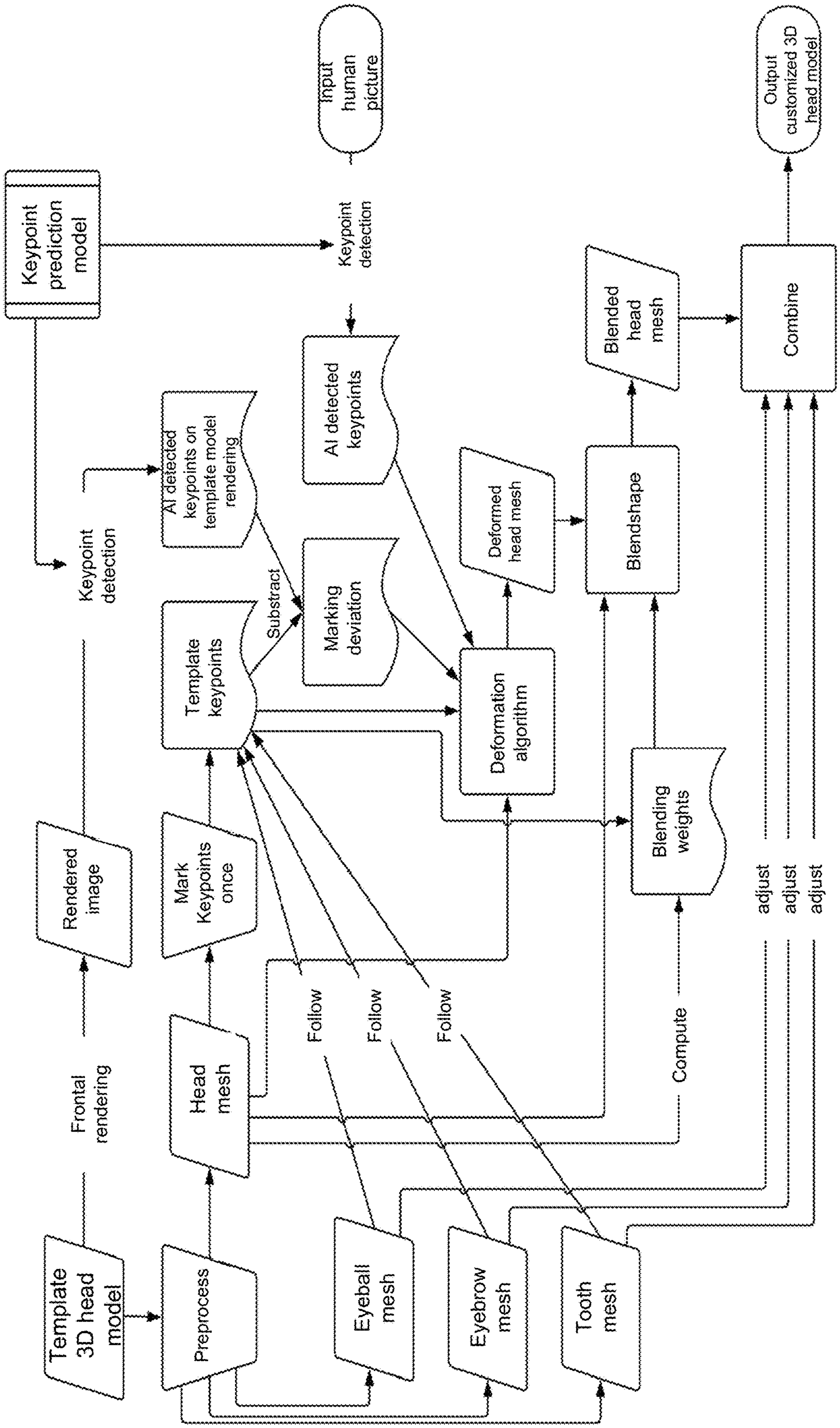
FIG. 20 is a flow diagram illustrating an exemplary head avatar deformation and generation process in accordance with some implementations of the present disclosure.

FIG. 20 is a flow diagram illustrating an exemplary head avatar deformation and generation process in accordance with some implementations of the present disclosure. Using the techniques proposed in this disclosure, head meshes can be properly deformed without binding with a skeleton. Therefore, the workload required from the artists is largely reduced. The techniques accommodate different styles of meshes to gain better generality. In production of game assets, artists could save head models in various formats using tools like 3DMax or Maya, but the inner representations of these formats are all polygon meshes. The polygon mesh can be easily converted into pure triangle mesh, which is called the template model. For each template model, 3D keypoints are marked on the template model once by hand. After that, it can be used for deforming into a characteristic head avatar according to the detected and reconstructed 3D keypoints from an arbitrary human face picture.

Figure 21:
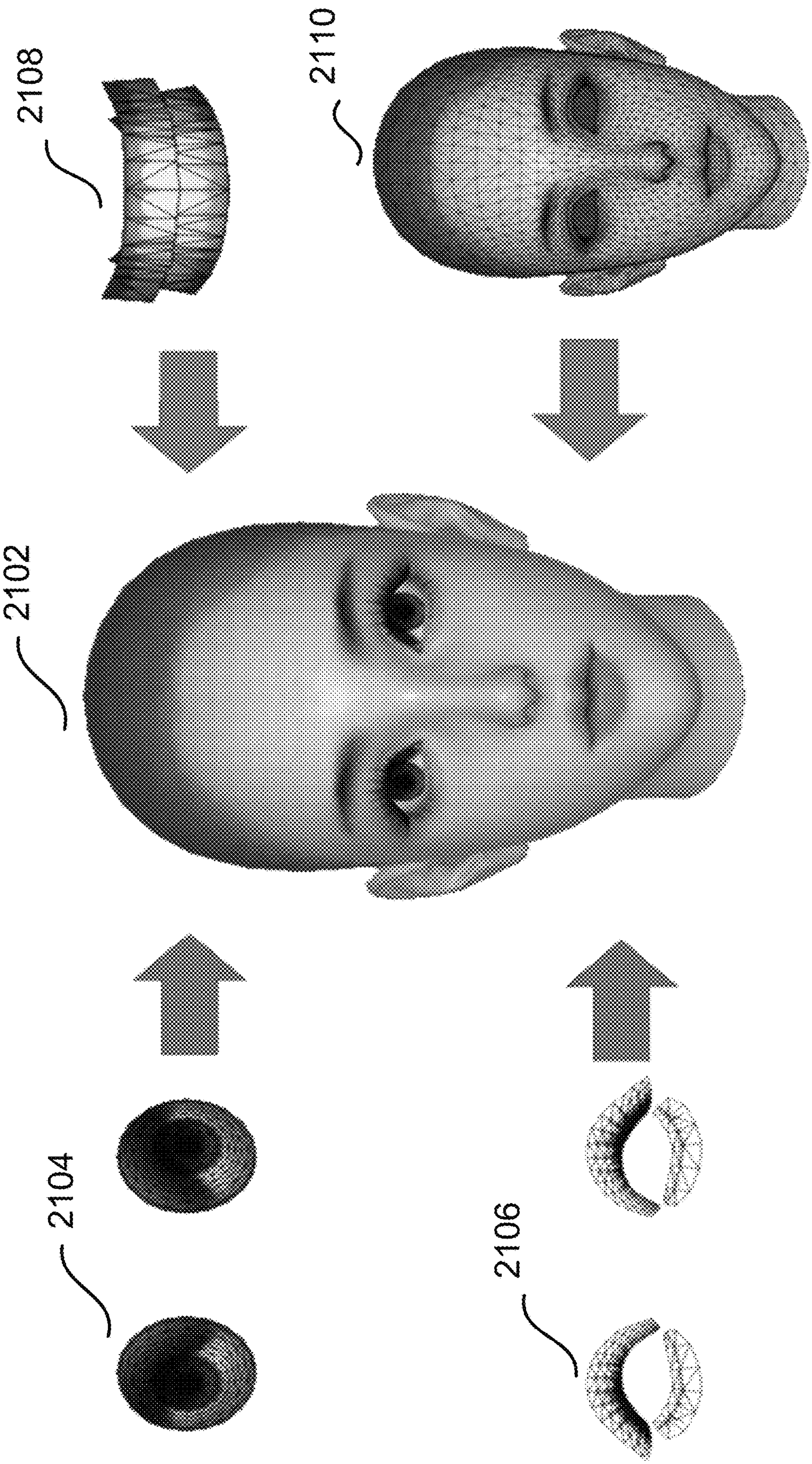
FIG. 21 is a diagram illustrating an exemplary head template model composition in accordance with some implementations of the present disclosure.

FIG. 21 is a diagram illustrating an exemplary head template model composition in accordance with some implementations of the present disclosure. The head template model 2102 usually consists of parts such as face 2110, eyes 2104, eyelashes 2106, teeth 2108, and hairs, as shown in FIG. 21. Without binding the skeleton, mesh deformation relies on the connected structure of the template meshes. Hence the template model needs to be broken into those sematic parts and the face mesh needs to be deformed first. All other parts can be automatically adjusted by setting up and following certain keypoints on the face mesh. In some embodiments, an interactive tool is provided to detect all topologically connected parts, and users can use it to conveniently exporting those sematic parts for further deforming.

Figure 22:
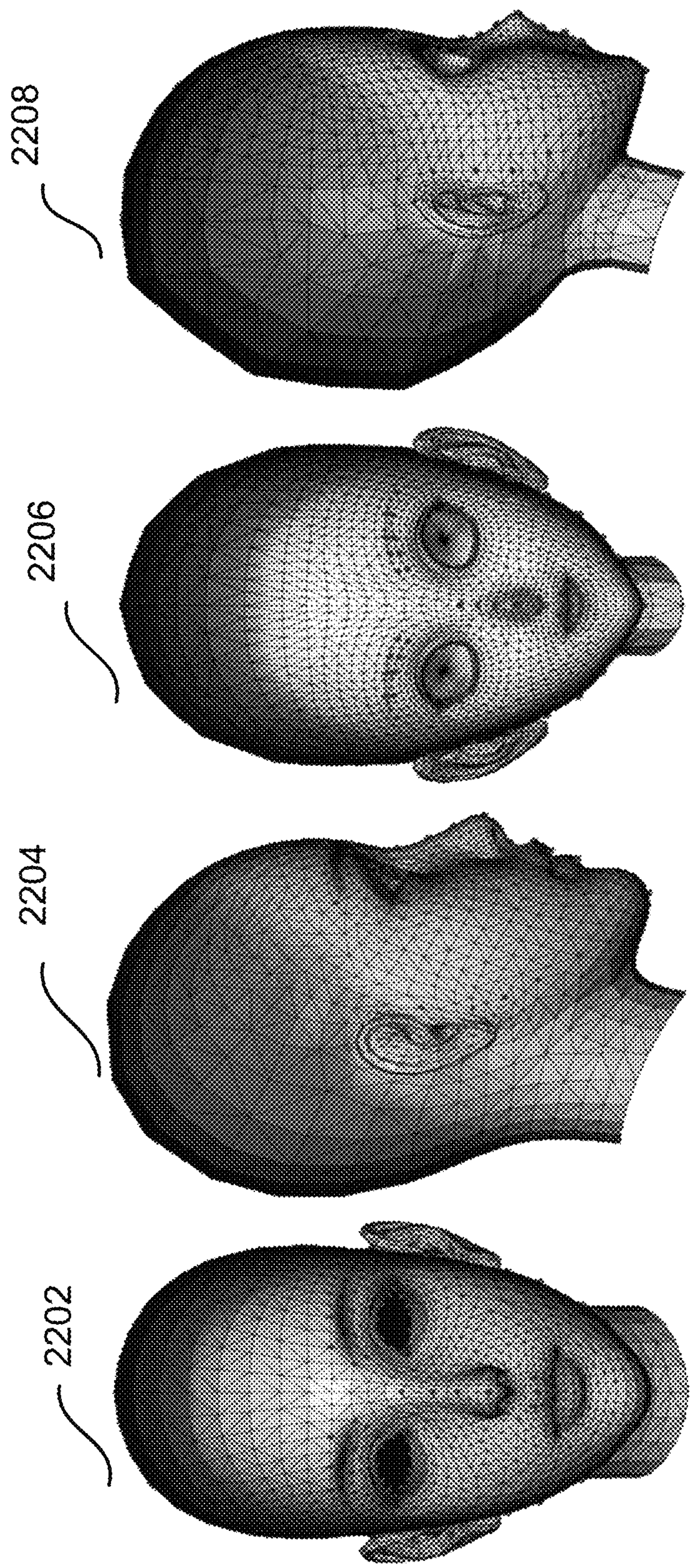
FIG. 22 is a diagram illustrating some exemplary keypoint marking on realistic style 3D models and on cartoon style 3D models in accordance with some implementations of the present disclosure.

In some embodiments, image keypoints of human face can be gained via some detection algorithms or AI models. For the purpose of driving mesh deformation, these keypoints need to be mapped to vertices on the template model. Because of the randomicity of mesh connection, and the lack of 3D human keypoint marking data, there are no tools that can automatically mark 3D keypoints on arbitrary head models accurately. Therefore, an interactive tool is developed, which can rapidly mark keypoints on 3D models manually. FIG. 22 is a diagram illustrating some exemplary keypoints marking on realistic style 3D models, such as 2202, 2204 and on cartoon style 3D models, such as 2206, 2208 in accordance with some implementations of the present disclosure.

Figure 23:
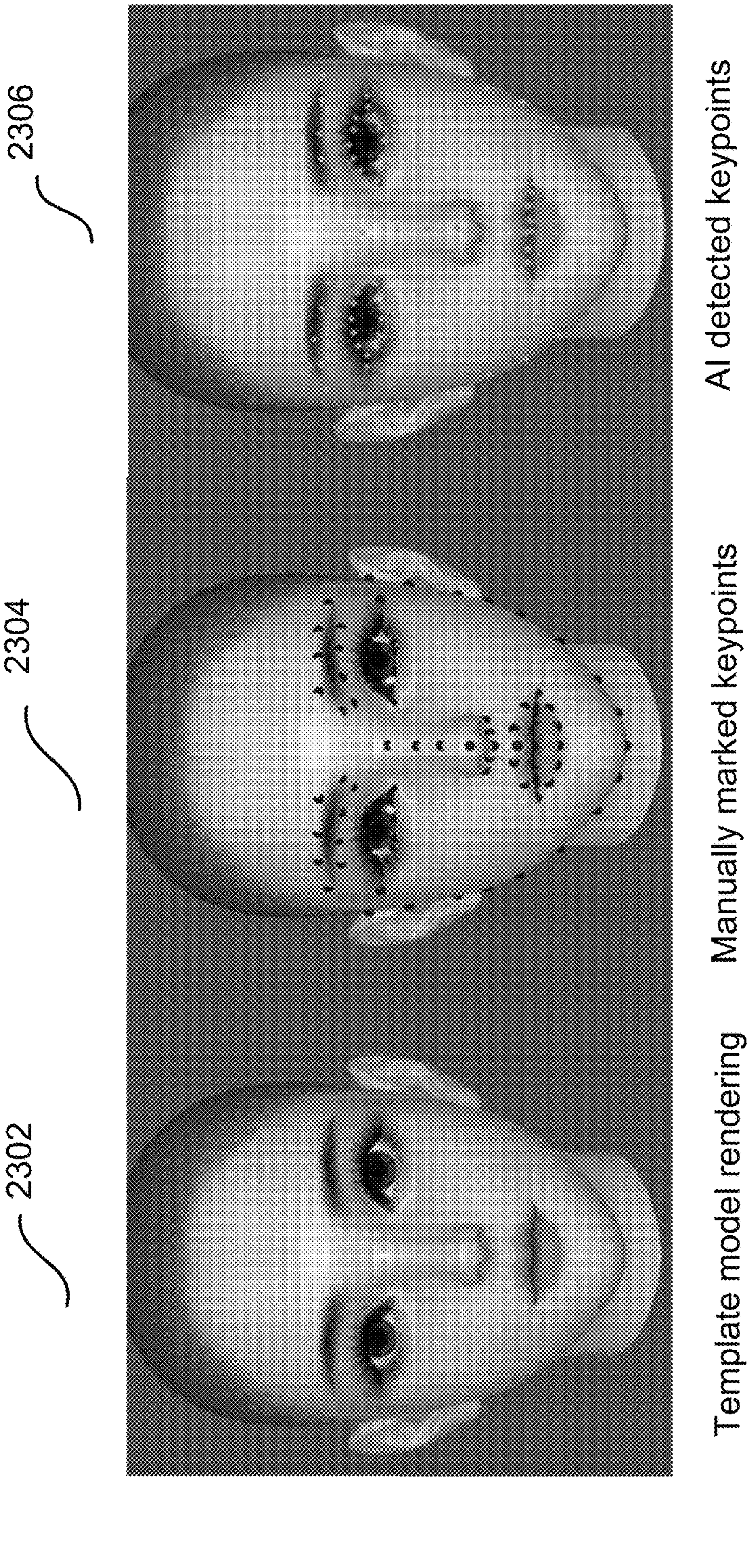
FIG. 23 is a diagram illustrating an exemplary comparison between the template model rendering, manually marked keypoints and AI detected keypoints in accordance with some implementations of the present disclosure.

In the procedure of marking, the positions of marked 3D keypoints on the 3D models should match the picture keypoints to the largest extent. Since the keypoints are marked on discrete vertices on the 3D model meshes, the importing of deviations is inevitable. To offset such deviations, one way is to define proper rules in the pose-processing. FIG. 23 is a diagram illustrating an exemplary comparison between the template model rendering, manually marked keypoints and AI detected keypoints in accordance with some implementations of the present disclosure. In some embodiments, for those models that are made relatively realistic, keypoint detection and reconstructed algorithms can be applied on the rendering of the template model (2302), and the results of 3D keypoints (2306), for example, by Artificial intelligence, can be further compared with that of the manually marked (2304) and the deviations are hence computed. When detecting human pictures, the computed deviations are reduced from the detected keypoints and the ill effects of artificial marking will be eliminated.

Figure 24:
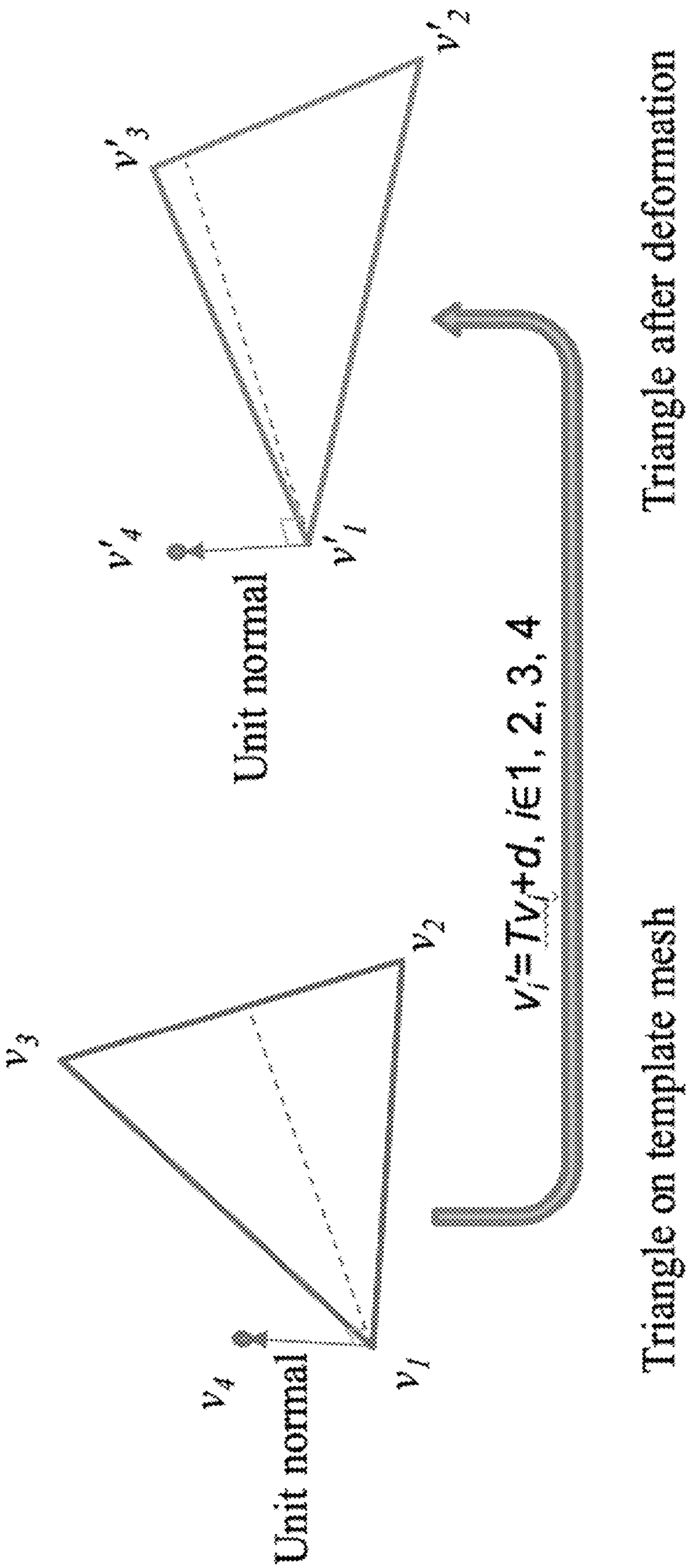
FIG. 24 is a diagram illustrating an exemplary triangle's affine transformation in accordance with some implementations of the present disclosure.

The method of affine deformation disclosed herein is a keypoint-driven mathematical modeling which ultimately solves a system of linear equations. The method disclosed here takes one step to deform the template meshes using detected keypoints as boundary conditions and employs different constraints in the process of optimization. FIG. 24 is a diagram illustrating an exemplary triangle's affine transformation in accordance with some implementations of the present disclosure.

In some embodiments, the deformation from the template meshes to the predicted meshes is considered as an assembly of each triangle's affine transformation. A triangle's affine transformation can be defined as a 3×3 matrix T and a translation vector d. As shown in FIG. 24, the deformed vertex's position after the affine transformation is noted as $v_i'=Tv_i+d$, $i\in 1 \ldots 4$, where $v_1$, $v_2$, $v_3$ represents each vertex of the triangle respectively and $v_4$ is an extra point introduced in the direction of the triangle's normal, which satisfy the equation $v_4=v_1+(v_2-v_1)\times(v_3-v_4)/\mathrm{sqrt}(|(v_2-v_4)\times(v_3-v_1)|)$. In the above equation, the result of the cross product is normalized so that it is proportional to the length of the triangle's edges. The reason of introducing $v_4$ is because the coordinates of three vertices are not enough for determining a unique affine transformation. After introducing $v_4$, a derived equation is obtained: $T=[v'_2-v'_1\ v'_3-v'_1\ v'_4-v'_1]\times[v_2-v_1\ v_3-v_1\ v_4-v_1]^{-1}$ and the non-translation part of the matrix T is determined. Since the matrix $V=[v_2-v_1\ v_3-v_1\ v_4-v_1]^{-1}$ only depends on the template mesh, invariant of other deformation factors, it can be pre-computed as a sparse coefficient matrix for building the linear system later.

So far the affine transformation T's non-translation part in math formulas is denoted. For building the linear system of optimization, assuming the number of mesh vertices is N and the number of triangles is F, the following four constraints are considered:

The constraints of keypoints' positions: $E_k=\Sigma_{i=1}\|v'_i-c'_i\|^2$, $c'_i$ stands for the detected keypoints positions after mesh deformation.

The constraints of adjacency smoothness: $E_s={}_{i=1}\Sigma_{j\in adj(i)}\|T_i-T_j\|^2$, which mean the affine transformation between adjacent triangles should be as similar as possible. The adjacency relationship can be inquired and stored in advance to avoid duplicated computation and improve the performance for building up the system.

The constraints of characteristics: $E_i=\Sigma_{i=1}\|T_i-I\|^2$, where I represents the identity matrix. This constraint means the affine transformation should be as close to be unchanged as possible, which helps to maintain the template mesh's characteristics.

The constraints of original positions: $E_1=\Sigma_{i=1}N\|v'_1-c_i\|^2$, where $c_i$ represents each vertex's position on the template mesh before deformation.

The final constraint is the weighted summation of the above constraints: $\min E=w_kE_k+w_sE_s+w_iE_i+w_lE_l$, where the weights $w_k$, $w_s$, $w_i$, $w_l$ are ranked from the strongest to the weakest. Using the above constraint, a linear system can be ultimately constructed and its size is $(F+N)\times(F+N)$, and the weights are multiplied with corresponding coefficients in the system. The unknowns are each vertex's coordinates after deformation, besides the extra point $v'_4$ for each triangle. Since the former terms are useful, the result of $v'_4$ will be thrown away. In the process of continuous deformation, all the constraint matrices but the constraints of keypoints' positions can be reused. Affine transformation can achieve a real time performance of 30 fps on ordinary personal computers and intelligent phones regarding meshes with thousands of vertices.

Figure 25:
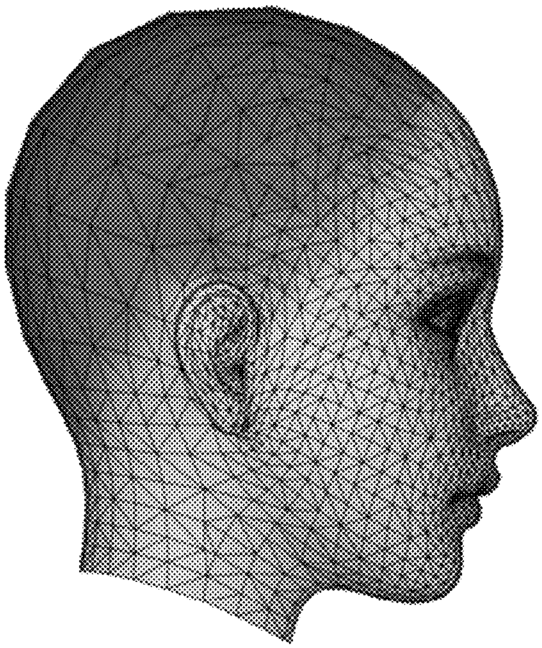
FIG. 25 is a diagram illustrating an exemplary comparison of some head model deformation results with and without a blendshape process in accordance with some implementations of the present disclosure.
Figure 25:
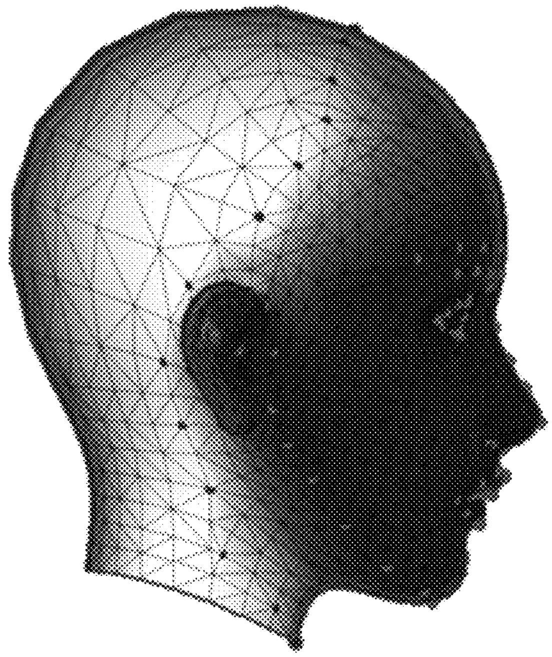
Figure 25:
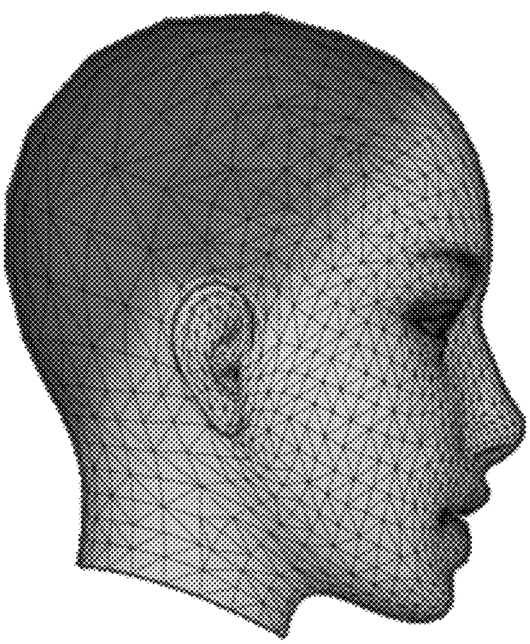
Figure 25:
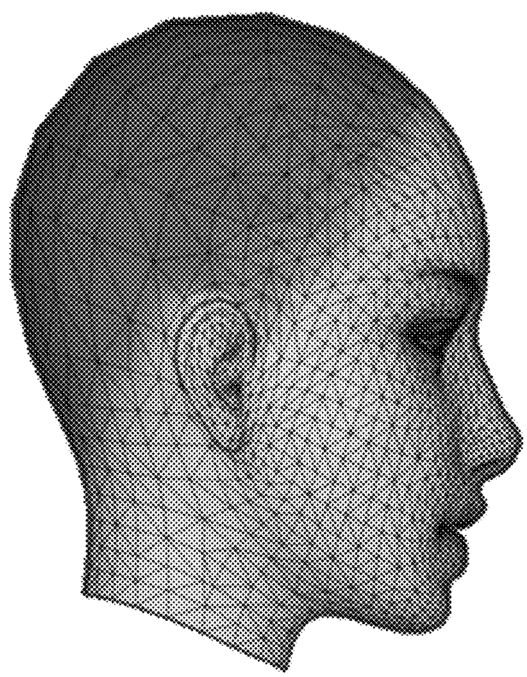

FIG. 25 is a diagram illustrating an exemplary comparison of some head model deformation results with and without a blendshape process in accordance with some implementations of the present disclosure.

In some embodiments, when deforming a head model of a game avatar, the region of interests usually is only the face. The top, the back side of the head and the neck should remain unchanged, otherwise it could result in mesh penetration between the head and the hair or the torso. To avoid this problem, the results of affine deformation and the template mesh are linearly interpolated in the manner of blendshape. The weights for blending could be painted in 3D modeling software, or computed with the biharmonic or affine deformation with minor alterations. For example, the weights on keypoints are set as is meanwhile more markers (dark points in 2504 in FIG. 25) are added on the head model and their weights are set to be 0s. In some embodiments, inequality constraints are added in the process of solving to force all weights falling into the range from 0 to 1, but doing so will largely increase the complexity of solving. Through experiments good results can be gained by clipping out the weights smaller than 0 or larger than 1. As shown in 2504 in FIG. 25, the weights of the model portion with darkest color are 1s, and the weights of the model portion which is colorless are 0s. There is a natural transition between the light keypoints and the dark markers in the bend weights rendering 2504. With Blendshape, the back side of the model (as shown in 2506 in FIG. 25) after deformation stays the same as the original (as shown in 2502 in FIG. 25). Without Blendshape, the back side of the model (as shown in 2508 in FIG. 25) after deformation does not stay the same as the original (as shown in 2502 in FIG. 25).

Figure 26:
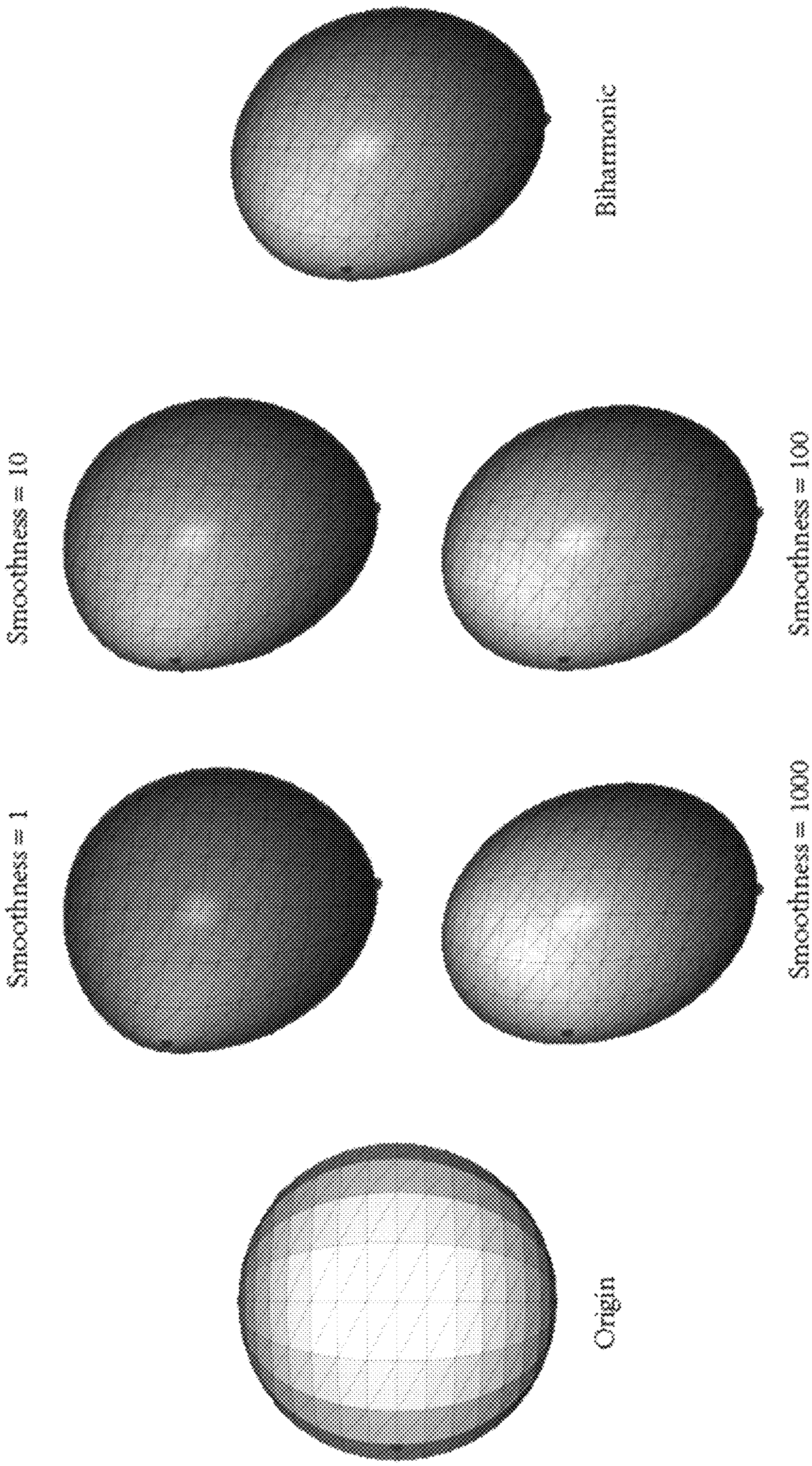
FIG. 26 is a diagram illustrating an exemplary comparison of affine deformation with different weights and biharmonic deformation in accordance with some implementations of the present disclosure.

In some embodiments, affine deformation could achieve different deformation effects by manipulating the constraints' weights, including mimicking the result of biharmonic deformation. FIG. 26 is a diagram illustrating an exemplary comparison of affine deformation with different weights and biharmonic deformation in accordance with some implementations of the present disclosure. As shown in FIG. 26, smoothness is the ratio of adjacency smoothness weight $w_s$ and characteristic weight $w_i$. The dark points are the keypoints, and the darkness of color represents the displacement between the vertex's deformed position and its original position. In all deformation results, one keypoint stays unchanged, and the other moves to the same location. It shows that when gradually increasing the adjacency smoothness weight against the characteristic weight, the smoothness of the deformed sphere also increases correspondingly. In addition, the result of the biharmonic deformation can match to that of affine deformation with smoothness falling in somewhere between 10 and 100. This indicates affine deformation has more degrees of freedom for deformation compared to biharmonic deformation.

Figure 27:
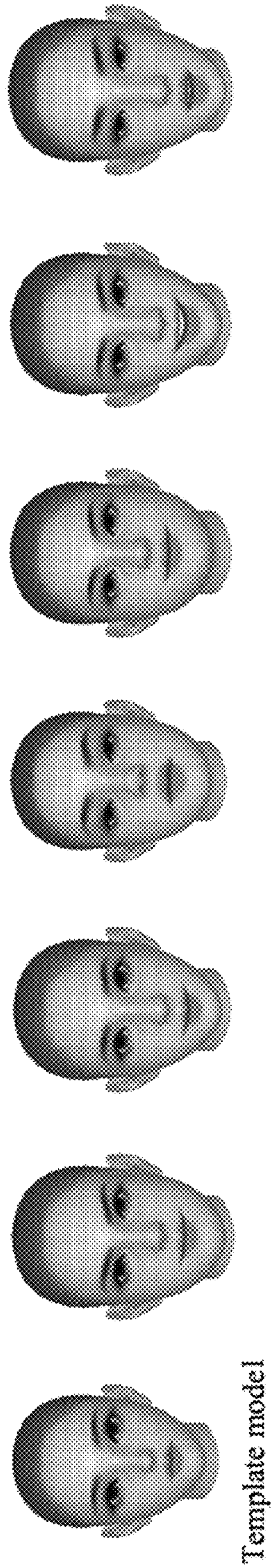
FIG. 27 illustrates some exemplary results which are automatically generated from some randomly picked female pictures, using a realistic template model in accordance with some implementations of the present disclosure.

Using the workflow described herein, games can easily integrate the function of intelligent generation of a head avatar. For example, FIG. 27 illustrates some exemplary results which are automatically generated from some randomly picked female pictures (not shown in FIG. 27), using a realistic template model in accordance with some implementations of the present disclosure. All the personalized head avatars reflect some characteristics of its corresponding picture.

Figure 28:
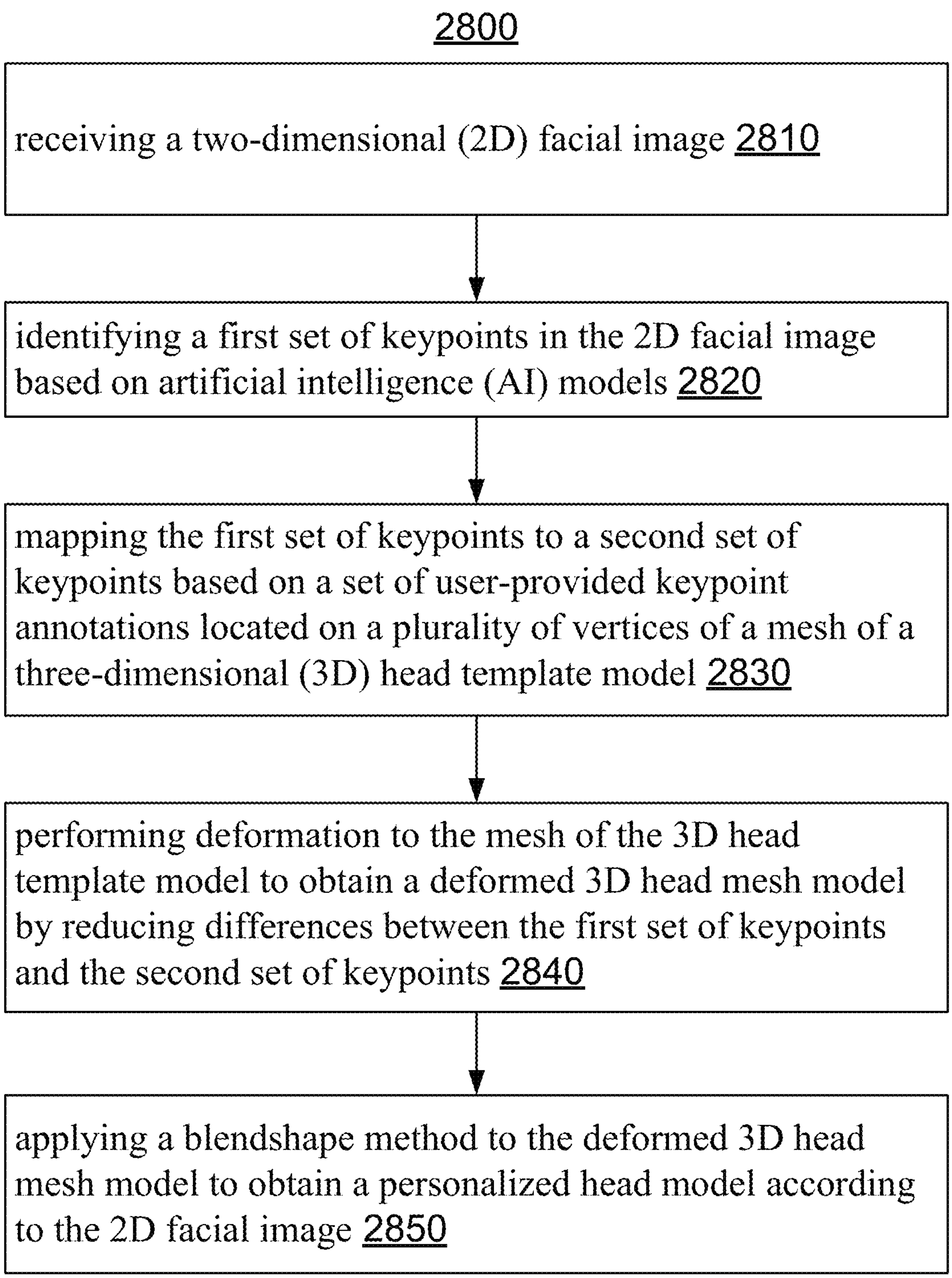
FIG. 28 is a flowchart illustrating an exemplary process of generating a 3D head deformation model from a 2D facial image of the real-life person in accordance with some implementations of the present disclosure.

FIG. 28 is a flowchart 2800 illustrating an exemplary process of generating a 3D head deformation model from a 2D facial image of the real-life person in accordance with some implementations of the present disclosure.

The process of generating a 3D head deformation model from a 2D facial image includes a step 2810 of receiving a two-dimensional (2D) facial image.

The process also includes a step 2820 of identifying the first set of keypoints in the 2D facial image based on artificial intelligence (AI) models.

The process additionally includes a step 2830 of mapping the first set of keypoints to the second set of keypoints based on the set of user-provided keypoint annotations located on a plurality of vertices of a mesh of a 3D head template model.

The process additionally includes a step 2840 of performing deformation to the mesh of the 3D head template model to obtain a deformed 3D head mesh model by reducing the differences between the first set of keypoints and the second set of keypoints.

The process additionally includes a step 2850 of applying a blendshape method to the deformed 3D head mesh model to obtain a personalized head model according to the 2D facial image.

Additional implementations may include one or more of the following features.

In some embodiments, the step 2830 of mapping may further include: relating the first set of keypoints on the 2D facial image to the plurality of vertices on the mesh of the 3d head template model; identifying the second set of keypoints based on the set of user-provided keypoint annotations on the plurality of vertices on the mesh of the 3D head template model; and mapping the first set of keypoints and the second set of keypoints based on the corresponding identified features by the respective keypoints on a face.

In some embodiments, the second set of keypoints is located by applying a previously computed deviation to the set of user-provided keypoint annotations. In some embodiments, the previously computed deviation is between a previous set of AI identified keypoints of the 3D head template model and a previous set of user-provided keypoint annotations on the plurality of vertices of the mesh of the 3D head template model.

In some embodiments, the step 2840 of performing deformation may include: deforming the mesh of the 3D head template model into the deformed 3D head mesh model by using the mapping of the first set of keypoints to the second set of keypoints, and by using boundary conditions for deformation relating to the first set of keypoints.

In some embodiments, the step 2840 of performing deformation may further include: applying different constraints in a process of deformation optimization that include one or more of keypoints' positions, adjacency smoothness, characteristics, and original positions.

In some embodiments, the step 2840 of performing deformation may further include: applying a constraint to a process of deformation that is a weighted summation of one or more of keypoints' positions, adjacency smoothness, characteristics, and original positions.

In some embodiments, the step 2820 of identifying the first set of keypoints includes using a convolutional neural network (CNN).

In some embodiments, the deformation includes an affine deformation without a Laplacian operator. In some embodiments, the affine deformation achieves a deformation tuning by changing a smoothness parameter.

In some embodiments, the mesh of the 3D head template model can be deformed without binding with a skeleton. In some embodiments, the facial deformation model includes a realistic style model or a cartoon style model.

In some embodiments, in the step 2850, applying the blendshape method to the deformed 3D head mesh model includes: designating a respective blend weight on a keypoint of the deformed 3D head mesh model according to a location of the keypoint; and applying different levels of deformations to the keypoints with different blend weights.

In some embodiments, in the step 2850, applying the blendshape method to the deformed 3D head mesh model includes: keeping the back side of the deformed 3D head mesh model the same shape as the original back side shape of the 3D head template model before the deformation.

In some embodiments, the sematic parts on the template model are not limited to eyes, eyelashes, or teeth. Decorations such as eyeglasses could potentially be adaptively adjusted by adding and tracking new keypoints on the face mesh.

In some embodiments, the keypoints on the template model are added manually. In some other embodiments, deep learning techniques can also be utilized to automatically add keypoints for different template models.

In some embodiments, the solving procedure of the affine deformation could take advantage of some numerical tricks to further improve its computing performance.

In some embodiments, the systems and methods disclosed herein form a Light-Weighted Keypoints based Face Avatar Generation System, that have many advantages such as those listed below:

Low requirements for input images. The system and method do not require the face to be directly facing the camera, and a certain degree of in-plane rotation, out-of-plane rotation and occlusion will not affect the performance obviously.

Applicable to both real and cartoon games. The present system does not limit the game style to the real one, and it can be applied to the cartoon style as well.

Lightweight and customized. Each module of the present system is relatively lightweight and is suitable for mobile devices. The modules in this system are decoupled and users can adopt different combinations according to different game styles to build the final face generation system.

In some embodiments, for a given single photo, the main face is first detected, and keypoint detection is performed. In a real picture, the face may not face the camera, and the real face is not always perfectly symmetrical. Therefore, the keypoints in the original picture is preprocessed to achieve a unified, symmetrical and smooth set of keypoints. Then the keypoints are adjusted according to the specific style of the game, such as enlarged eyes, and thin face. After getting the stylized keypoints, the stylized keypoints are converted into the control parameters of the face model in the game, generally bone parameters or slider parameters.

Figure 29:
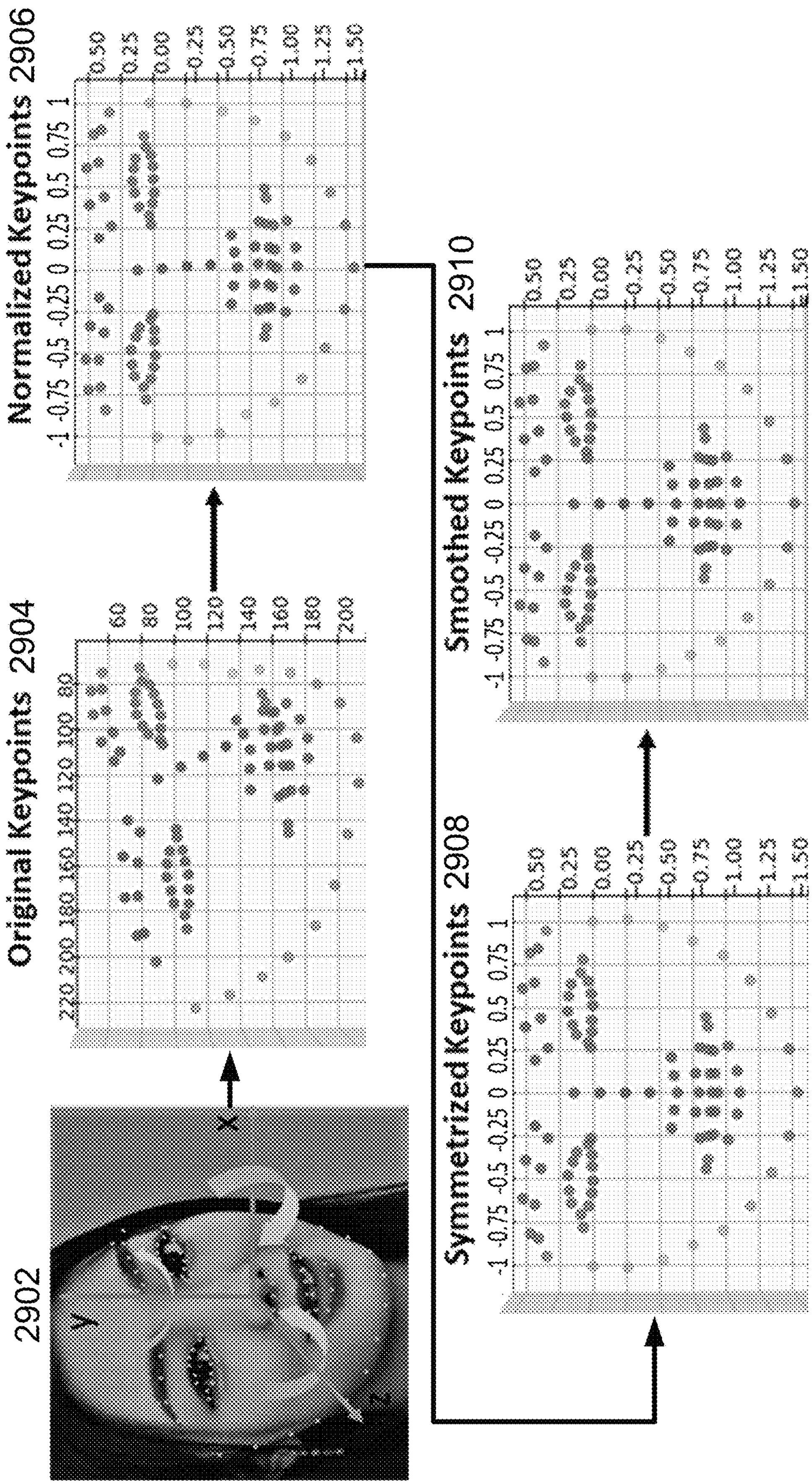
FIG. 29 is a diagram illustrating an exemplary keypoint processing flow steps in accordance with some implementations of the present disclosure.

In some embodiments, the viewing angle of the real face may not be directly facing the camera, and there may exist problems such as left-right asymmetry and keypoint detection errors. FIG. 29 is a diagram illustrating an exemplary keypoints processing flow steps in accordance with some implementations of the present disclosure. The keypoints detected from the original picture 2904 cannot be used directly, and certain processing is required. Here, the process is divided into three steps: normalization, symmetry, and smoothing, as shown in FIG. 29.

In some embodiments, the standard face model in the game based on the prediction of the keypoints of the real face needs to be adjusted. The process needs to ensure that the keypoints of the standard face model in the game and the real face are aligned in terms of scale, position, and direction. Therefore, normalization 2906 of the predicted keypoints and the keypoints on the game face model, includes the following parts: normalization of scale, normalization of translation, and normalization of angle.

In some embodiments, all three-dimensional face keypoints of the original detection is defined as p, where the i-th keypoint is $p_i=\{x_i, y_i, z_i\}$. For example, the normalized origin is defined as the midpoint of keypoints No. 1 and No. 17 (referring to the definition of keypoints in FIG. 1), namely $c=(p_1+p_{17})/2$. For the scale, the distance between the 1st and 17th keypoints from the origin is adjusted to 1, so that the three-dimensional keypoint normalized by scale and translation is $p'=(p-c)/\|p_1-c)\|$.

In some embodiments, after normalizing the scale and translation, the face direction is further normalized. As shown in the image 2902 of FIG. 29, the face in the actual photo may not face the lens directly, and there will always be a certain deflection, which may exist on the three coordinate axes. The predicted three-dimensional keypoints of the face along the x, y, and z coordinate axes are sequentially rotated so that the direction of the face is facing the camera. When rotating along x, the z coordinates of key points 18 and 24 (referring to the definition of keypoints in FIG. 1) are aligned, that is, let the depth of the uppermost part of the bridge of the nose be at the same depth as the bottom of the nose, to obtain the rotation matrix $R_X$. When rotating along the y axis, the z coordinates of keypoints 1 and 17 are aligned to get the rotation matrix $R_Y$. When rotating along the z axis, the y coordinates of key point 1 and 17 are aligned to get the rotation matrix $R_Z$. Thus the direction of the keypoints are aligned and the normalized keypoints are shown as below:

$$P_{norm} = R_Z \times R_Y \times R_X \times P'$$

In some embodiments, the scale, position, and angle of the normalized keypoints have been adjusted to be uniform, but the obtained keypoints are often not a perfect face. For example, the bridge of the nose is not a straight line at the center, and the facial features may not be symmetrical. This is because the real face in the photo is not perfectly symmetrical due to the expression or its own characteristics, and additional errors will be introduced when predicting keypoints. Although the real face may not be symmetrical, if the face model in the game is not symmetrical, it will cause unsightly appearance and will greatly reduce the user experience. Therefore, keypoint symmetry as shown in 2908 is a necessary process.

Because the keypoints have been normalized, in some embodiments, a simple symmetry method is to average the y and z coordinates of all the left and right symmetric keypoints to replace the original y and z coordinates. This method works well in most cases, but when the face rotates at a large angle in the y-axis direction, the performance will be sacrificed.

In some embodiments, using the human face in FIG. 29 as an example, when the face is deflected to the left by a large angle, part of the eyebrows will not be visible. At the same time, the left eye will be smaller than the right eye due to perspective. Although the 3D keypoints can partially compensate for the impact caused by the perspective relationship, the 2D projection of the 3D keypoints corresponding to the keypoints still needs to be kept on the picture. Therefore, an excessively large angle deflection will result in obvious differences in the sizes of eyes and brows in the 3D keypoint detection results. In order to deal with the influence caused by the angle, when the face deflection angle along the y axis is large, the eyes and eyebrows close to the lens are used as the main eye and main eyebrow, and they are copied to the other side to reduce the error caused by angular deflection.

In some embodiments, since the prediction error of the keypoints is inevitable, in some individual cases, the symmetrized keypoints may still not match the real face. Since the shapes of real faces and facial features are quite different, it is difficult to achieve a relatively accurate description using predefined parameterized curves. Therefore, when smoothing as shown in 2910, only some areas are smoothed, for example, the outline of the face, eyes, eyebrows, lower lip, etc. These areas basically maintain the monotonous and smooth, that is, there is no jagged condition. In this case, the target curve should always be a convex curve or a concave curve.

Figure 30:
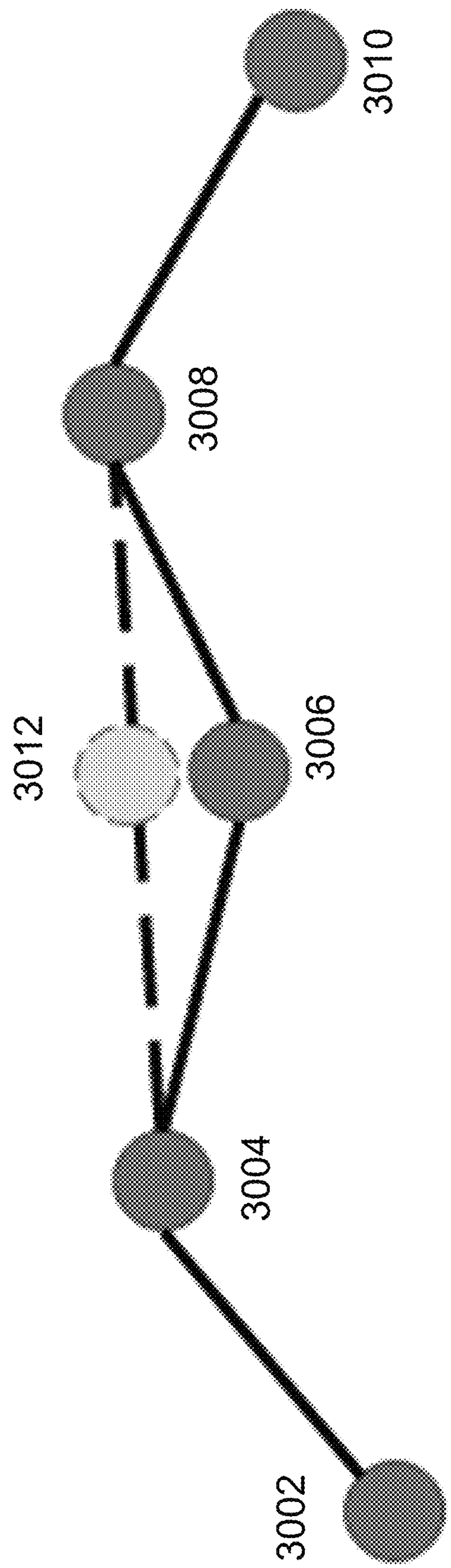
FIG. 30 is a diagram illustrating an exemplary keypoint smoothing process in accordance with some implementations of the present disclosure.

In some embodiments, whether the keypoints meet the definition of convex curve (or concave curve) is checked one by one for the concerned boundary. FIG. 30 is a diagram illustrating an exemplary keypoint smoothing process 2910 in accordance with some implementations of the present disclosure. As shown in FIG. 30, without loss of generality, the target curve should be convex. For each keypoint 3002, 3004, 3006, 3008, and 3010, whether its position is above the line of its adjacent left and right key points is checked. If the conditions are met, it means that the current keypoint meets the convex curve requirements. Otherwise, the current key point is moved up to the line connecting the left and right key points. For example, in FIG. 30, the key point 3006 does not meet the limit of the convex curve, and it will be moved to the position 3012. If multiple keypoints are moved, the curve may not be guaranteed to be convex or concave after moving. Therefore, in some embodiments, multiple rounds of smoothing are used to get a relatively smooth key point curve.

Different games have different face styles. In some embodiments, the keypoints of real faces need to be transformed into the styles required by the game. Real style game faces are similar, but cartoon faces are very different. Therefore, it is difficult to have a uniform standard for the stylization of keypoints. The definition of stylization in actual use comes from the designer of the game, who adjusts the characteristics of the face according to the specific game style.

In some embodiments, a more general face adjustment scheme is implemented that most games may need. For example, face length adjustment, width adjustment, facial features, etc. According to different game art styles, adjustment levels, zoom ratios, etc., custom corrections can be made. At the same time, users can also customize any special style adjustment methods, for example, changing the eye shape to a rectangle. The system can support any way of adjustment.

In some embodiments, with the keypoints of the stylized face, the standard game face is deformed so that the keypoints of the deformed face reach the position of the target keypoints. Since most games use control parameters, such as bones or sliders, to adjust the face, a set of control parameters is needed to move the keypoints to the target position.

Since the definitions of bones or sliders in different games may vary, and there is the possibility of modification at any time, it is not feasible to directly define simple parameterized functions from keypoints to bone parameters. In some embodiments, machine learning method is used to convert keypoints to parameters through a neural network, which is called a K2P (keypoints to parameters) network. Because the general parameters and the number of keypoints are not large (generally less than 100), in some embodiments, a K-layer fully connected network is used.

Figure 31:
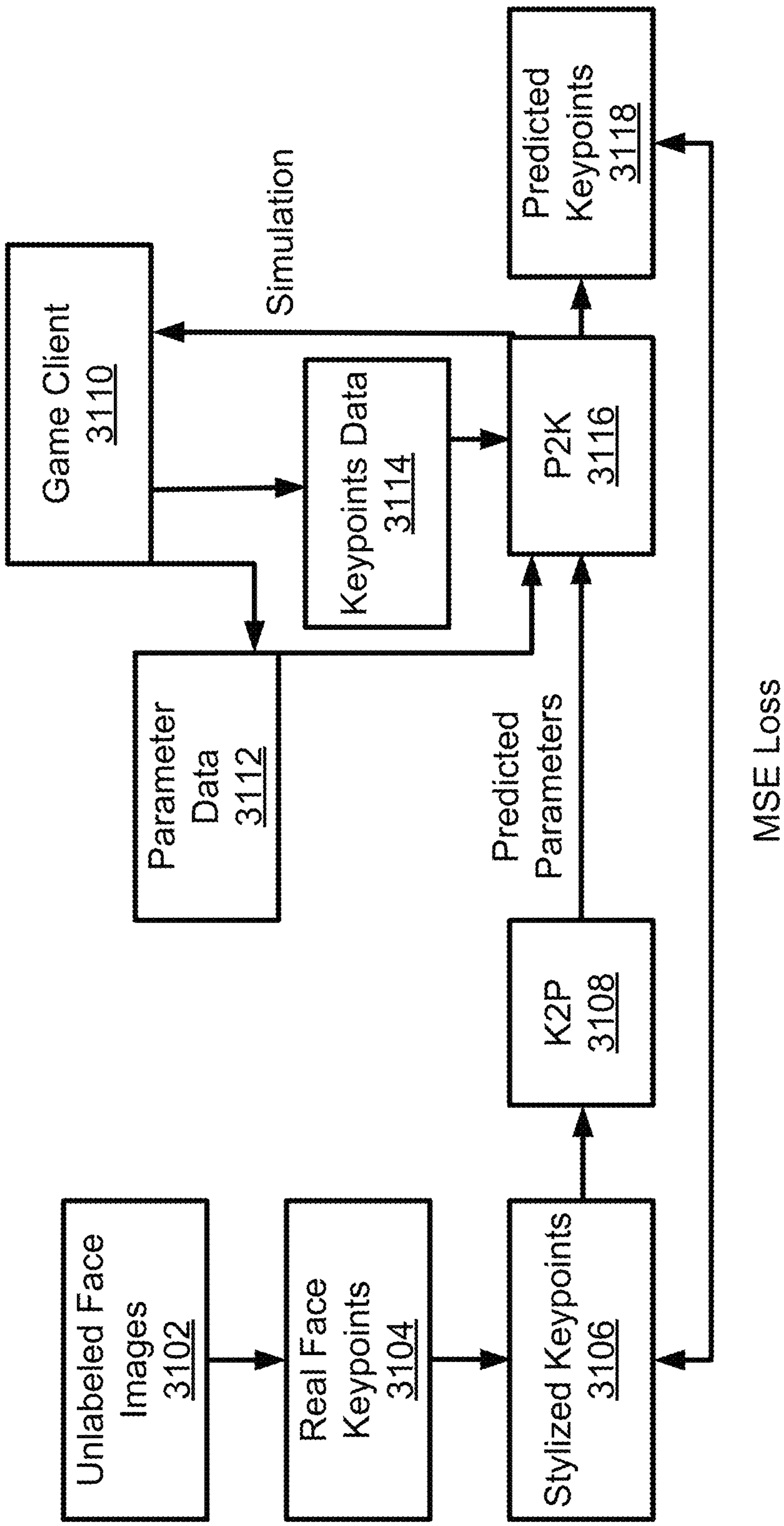
FIG. 31 is a block diagram illustrating an exemplary keypoints to control parameters (K2P) conversion process in accordance with some implementations of the present disclosure.

FIG. 31 is a block diagram illustrating an exemplary keypoints to control parameters (K2P) conversion process in accordance with some implementations of the present disclosure. In order to use the machine learning method, in some embodiments, first the bones or slider parameters are randomly sampled, fed to the game client 3110, and the keypoints are extracted in the generated game face. In this way, a lot of training data can be obtained (parameters 3112 and keypoints 3114 pairs). Then a self-supervised machine learning method is implemented, which is divided into two steps: the first step is to train a P2K (parameters to keypoints) network 3116 to simulate the process of generating game parameters to keypoints. In the second step, a large number of unlabeled real face images 3102 are used to generate real face keypoints 3104 and then a large number of stylized keypoints 3106 according to the methods described herein. These unlabeled stylized keypoints 3106 are the self-supervised learning training data. In some embodiments, a set of keypoints K is input into the K2P network 3108 for learning to get the output parameter P. Since the ground truth of the ideal parameters corresponding to these keypoints is not available, P is further input into the P2K network 3116 trained in the first step to obtain the key point K'. In some embodiments, by calculating the Mean Square Error (MSE) loss between K and K', the K2P network 3108 can be learned. In some embodiments, during the second step, the P2K network 3116 is fixed and will not continue to be adjusted. With the aid of the P2K network 3116, the process of controlling the parameters of the game client 3110 to the keypoints is simulated using a neural network, thus laying a foundation for the learning of the K2P network 3108 in the second step. In this way, the final face generated by the parameters remains close to the keypoints of the target stylized face generated.

In some embodiments, at the same time, weights to certain keypoints are added, such as the keypoints of the eyes, by adjusting the corresponding weights when calculating the MSE loss between K and K'. Since the definition of keypoints is predefined and will not be affected by the bones or sliders of the game client, it is easier to adjust the weight.

In some embodiments, in the actual applications, in order to improve the accuracy of the model, for the part that can be decoupled, the neural networks can be separately trained. For example, if some bone parameters only affect the keypoints of the eye area, while other parameters have no effect on this area, these parameters and this part of the keypoints form a set of independent areas. A separate K2P model 3108 is trained for each group of such regions, and each model can adopt a more lightweight network design. This not only can further improve the accuracy of the model, but also reduce the computational complexity.

Figure 32:
FIG. 32 illustrates some exemplary results of automatic face generation of a mobile game in accordance with some implementations of the present disclosure.

FIG. 32 illustrates some exemplary results of automatic face generation of a mobile game in accordance with some implementations of the present disclosure. As shown in FIG. 32, the results from the original face images (3202 and 3206) to the game face avatar image generations (3204 and 3208) are illustrated. In some embodiments, when stylizing, the open mouth is closed, and different levels of restriction and cartoonization are applied to the nose, mouth, face shape, eyes, and eyebrows. The final generated results still retain certain human face characteristics and meet the aesthetic requirements for the game style.

Figure 33:
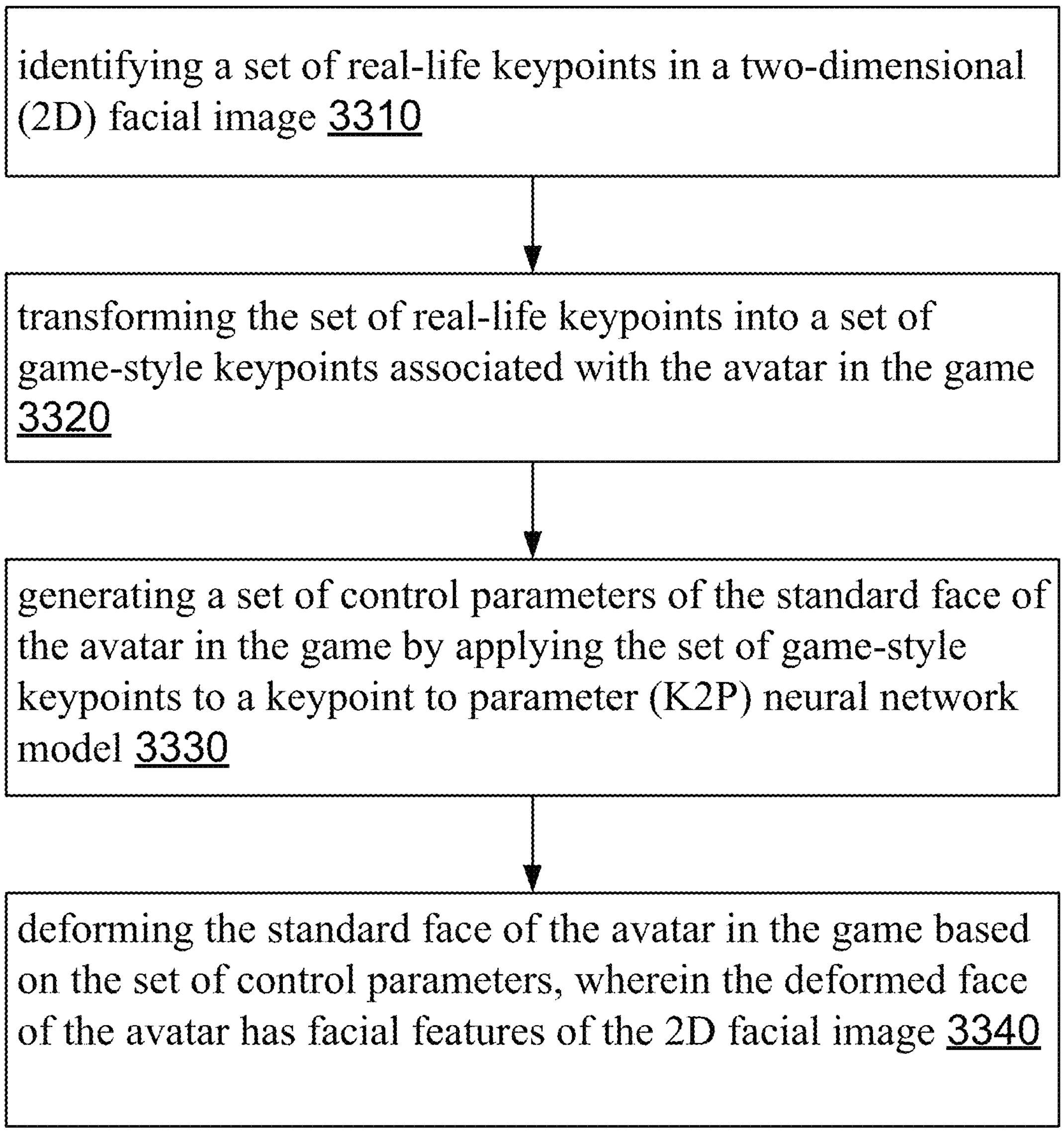
FIG. 33 is a flowchart illustrating an exemplary process of customizing a standard face of an avatar in a game using a 2D facial image of a real-life person in accordance with some implementations of the present disclosure.

FIG. 33 is a flowchart 3300 illustrating an exemplary process of customizing a standard face of an avatar in a game using a 2D facial image of a real-life person in accordance with some implementations of the present disclosure.

The process of process of customizing a standard face of an avatar in a game using a 2D facial image of a real-life person includes a step 3310 of identifying a set of real-life keypoints in the 2D facial image.

The process also includes a step 3320 of transforming the set of real-life keypoints into a set of game-style keypoints associated with the avatar in the game.

The process additionally includes a step 3330 of generating a set of control parameters of the standard face of the avatar in the game by applying the set of game-style keypoints to a keypoint to parameter (K2P) neural network model.

The process additionally includes a step 3340 of deforming the standard face of the avatar in the game based on the set of control parameters, wherein the deformed face of the avatar has the facial features of the 2D facial image.

Additional implementations may include one or more of the following features.

In some embodiments, in the step 3330, the K2P neural network model is trained by: obtaining a plurality of training 2D facial images of real-life persons; generating a set of training game-style keypoints for each of the plurality of training 2D facial images; feeding each set of training game-style keypoints into the K2P neural network model to obtain a set of control parameters; feeding the set of control parameters into a pretrained parameter to keypoint (P2K) neural network model to obtain a set of predicted game-style keypoints corresponding to the set of training game-style keypoints; and updating the K2P neural network model by reducing the difference between the set of training game-style keypoints and the corresponding set of predicted game-style keypoints.

In some embodiments, the pretrained P2K neural network model is configured to: receive a set of control parameters that include the bones or slider parameters associated with the avatar in the game; and predict a set of game-style keypoints for the avatar in the game in accordance with the set of control parameters.

In some embodiments, the difference between the set of training game-style keypoints and the corresponding set of predicted game-style keypoints is a sum of mean square errors between the set of training game-style keypoints and the corresponding set of predicted game-style keypoints.

In some embodiments, the trained K2P and the pretrained P2K neural network models are specific to the game.

In some embodiments, the set of real-life keypoints in the 2D facial image correspond to the facial features of the real-life person in the 2D facial image.

In some embodiments, the standard face of the avatar in the game can be customized into different characters of the game according to the facial images of different real-life persons.

In some embodiments, the deformed face of the avatar is a cartoon-style face of the real-life person. In some embodiments, the deformed face of the avatar is a real-style face of the real-life person.

In some embodiments, in the step 3320, transforming the set of real-life keypoints into the set of game-style keypoints includes: normalizing the set of real-life keypoints into a canonical space; symmetrizing the normalized set of real-life keypoints; and adjusting the symmetrized set of real-life keypoints according to a predefined style associated with the avatar in the game.

In some embodiments, normalizing the set of real-life keypoints into a canonical space includes: scaling the set of real-life keypoints into the canonical space; and rotating the scaled set of real-life keypoints according to the orientations of the set of real-life keypoints in the 2D facial image.

In some embodiments, transforming the set of real-life keypoints into the set of game-style keypoints further includes smoothing the set of symmetrized keypoints to meet the predefined convex or concave curve requirements.

In some embodiments, adjusting the symmetrized set of real-life keypoints according to the predefined style associated with the avatar in the game includes one or more of the face length adjustment, face width adjustment, facial feature adjustment, zoom adjustment, and eye shape adjustment.

The systems and methods disclosed herein could be applied to automatic face generation systems for various games for both real-style and cartoon-style games. The system has easy interface to be incorporated, improving user experience.

In some embodiments, the system and method disclosed herein can be used in the 3D face avatar generation system for various games, and the complicated manual tuning process is automated to improve the user experience. The user can take a selfie or upload an existing photo. The system can extract features from the face in the photo, and then automatically generate the control parameters of the game face (such as bones or sliders) through the AI face generation system. The game end generates a face avatar using these parameters, so that the created face has the user's facial features.

In some embodiments, this system can be easily customized according to different games, including the keypoint definition, the stylization method, the definition of the skeleton/slider, and so on. Users can choose to adjust only certain parameters, retrain the model automatically, or add custom control algorithms. In this way, the invention can be easily deployed to different games.

Further embodiments also include various subsets of the above embodiments combined or otherwise re-arranged in various other embodiments.

Herein, an image processing apparatus of the embodiments of the present application is implemented with reference to descriptions of accompanying drawings. The image processing apparatus may be implemented in various forms, for example, different types of computer devices such as a server or a terminal (for example, a desktop computer, a notebook computer, or a smartphone). A hardware structure of the image processing apparatus of the embodiments of the present application is further described below. It may be understood that FIG. 34 merely shows an exemplary structure, rather than all structures, of the image processing apparatus, and a partial or entire structure shown in FIG. 34 may be implemented according to requirements.

Figure 34:
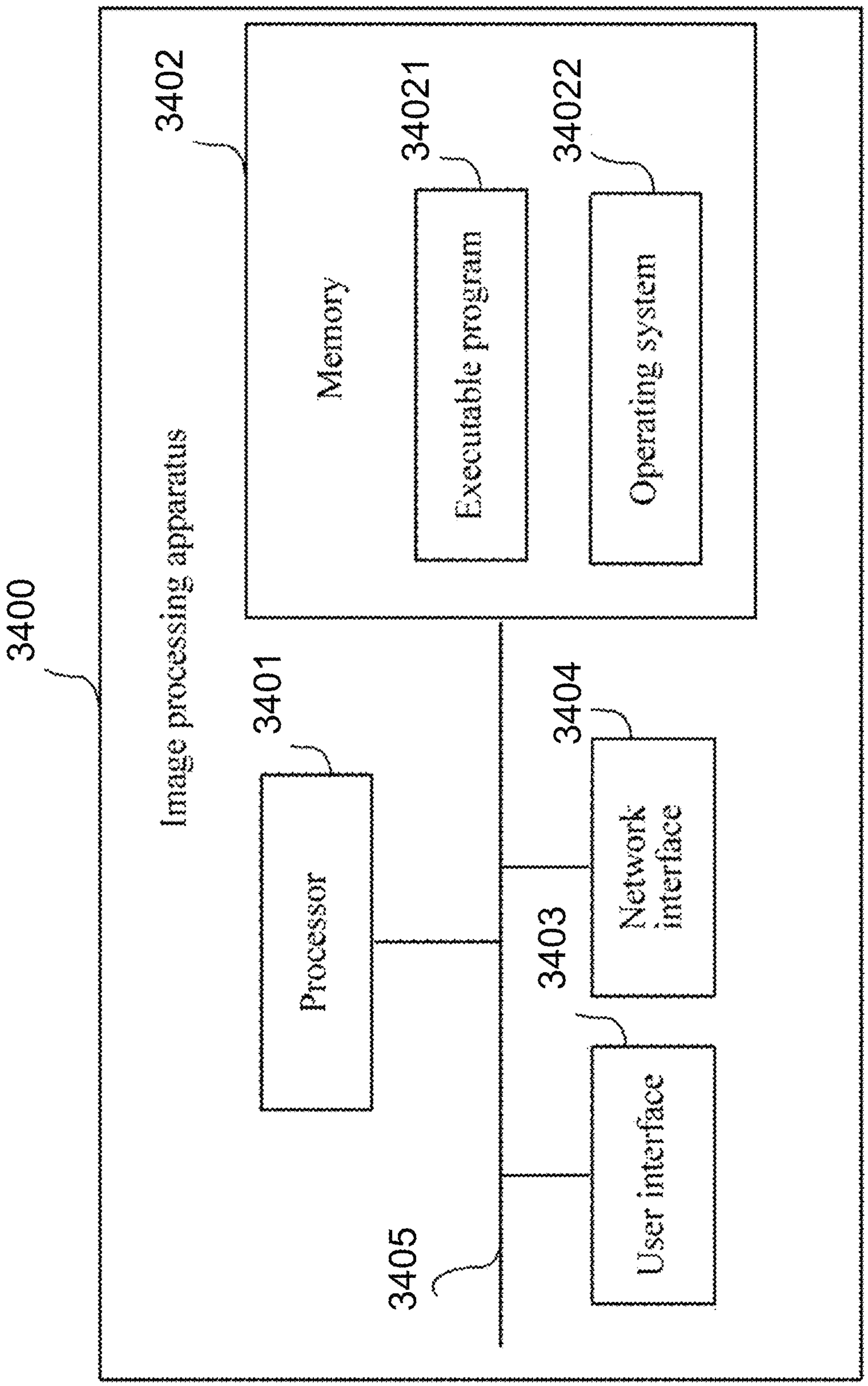
FIG. 34 is a schematic diagram of an exemplary hardware structure of an image processing apparatus in accordance with some implementations of the present disclosure.

Referring to FIG. 34, FIG. 34 is a schematic diagram of an optional hardware structure of an image processing apparatus according to an embodiment of the present application, and in an actual application, may be applied to the server or various terminals running an application program. An image processing apparatus 3400 shown in FIG. 34 includes: at least one processor 3401, a memory 3402, a user interface 3403, and at least one network interface 3404. Components in the image processing apparatus 3400 are coupled together by means of a bus system 3405. It may be understood that the bus 3405 is configured to implement connection and communication between the components. The bus system 3405, besides including a data bus, may further include a power bus, a control bus, and a status signal bus. However, for a purpose of a clear explanation, all buses are marked as the bus system 3405 in FIG. 34.

The user interface 3403 may include a display, a keyboard, a mouse, a trackball, a click wheel, a key, a button, a touchpad, a touchscreen, or the like.

It may be understood that the memory 3402 may be a volatile memory or a non-volatile memory, or may include both a volatile memory and a non-volatile memory.

The memory 3402 in the embodiments of the present application is configured to store different types of data to support operations of the image processing apparatus 3400. Examples of the data include: any computer program, such as an executable program 34021 and an operating system 34022, used to perform operations on the image processing apparatus 3400, and a program used to perform the image processing method of the embodiments of the present application may be included in the executable program 34021.

The image processing method disclosed in the embodiments of the present application may be applied to the processor 3401, or may be performed by the processor 3401. The processor 3401 may be an integrated circuit chip and has a signal processing capability. In an implementation process, each step of the image processing method may be completed by using an integrated logic circuit of hardware in the processor 3401 or an instruction in a software form. The foregoing processor 3401 may be a general-purpose processor, a digital signal processor (DSP), another programmable logic device, a discrete gate, a transistor logic device, a discrete hardware component, or the like. The processor 3401 may implement or execute methods, steps, and logical block diagrams provided in the embodiments of the present application. The general purpose processor may be a microprocessor, any conventional processor, or the like. The steps in the method provided in the embodiments of the present application may be directly performed by a hardware decoding processor, or may be performed by combining hardware and software modules in a decoding processor. The software module may be located in a storage medium. The storage medium is located in the memory 3402. The processor 3401 reads information in the memory 3402 and performs steps of the image processing method provided in the embodiments of the present application by combining the information with hardware thereof.

In some embodiments, the image processing and 3D facial and head formation can be accomplished on a group of servers or a cloud on a network.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media that is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method of customizing a standard face of an avatar in a game using a two-dimensional (2D) facial image of a real-life person, comprising:

identifying a set of real-life keypoints in the 2D facial image;

transforming the set of real-life keypoints into a set of game-style keypoints associated with the avatar in the game;

generating a set of control parameters of the standard face of the avatar in the game by applying the set of game-style keypoints to a keypoint to parameter (K2P) neural network model, wherein the K2P neural network model is trained by:

obtaining a plurality of training 2D facial images of real-life persons;

generating a set of training game-style keypoints for each of the plurality of training 2D facial images;

feeding each set of training game-style keypoints into the K2P neural network model to obtain a set of control parameters;

feeding the set of control parameters into a pretrained parameter to keypoint (P2K) neural network model to obtain a set of predicted game-style keypoints corresponding to the set of training game-style keypoints; and updating the K2P neural network model by reducing a difference between the set of training game-style keypoints and the corresponding set of predicted game-style keypoints; and deforming the standard face of the avatar in the game based on the set of control parameters, wherein the deformed face of the avatar has facial features of the 2D facial image.

2. The method according to claim 1, wherein the pretrained P2K neural network model is configured to:

receive a set of control parameters that include bones or slider parameters associated with the avatar in the game; and predict a set of game-style keypoints for the avatar in the game in accordance with the set of control parameters.

3. The method according to claim 2, wherein the difference between the set of training game-style keypoints and the corresponding set of predicted game-style keypoints is a sum of mean square errors between the set of training game-style keypoints and the corresponding set of predicted game-style keypoints.

4. The method according to claim 2, wherein the trained K2P and the pretrained P2K neural network models are specific to the game.

5. The method according to claim 1, wherein the set of real-life keypoints in the 2D facial image corresponds to the facial features of the real-life person in the 2D facial image.

6. The method according to claim 1, wherein the standard face of the avatar in the game can be customized into different characters of the game according to facial images of different real-life persons.

7. The method according to claim 1, wherein the deformed face of the avatar is a cartoon-style face of the real-life person.

8. The method according to claim 1, wherein the deformed face of the avatar is a real-style face of the real-life person.

9. The method according to claim 1, wherein transforming the set of real-life keypoints into the set of game-style keypoints includes:

normalizing the set of real-life keypoints into a canonical space;

symmetrizing the normalized set of real-life keypoints; and adjusting the symmetrized set of real-life keypoints according to a predefined style associated with the avatar in the game.

10. The method according to claim 9, wherein normalizing the set of real-life keypoints into a canonical space includes:

scaling the set of real-life keypoints into the canonical space; and rotating the scaled set of real-life keypoints according to orientations of the set of real-life keypoints in the 2D facial image.

11. The method according to claim 9, wherein transforming the set of real-life keypoints into the set of game-style keypoints further includes smoothing the set of symmetrized keypoints to meet predefined convex or concave curve requirements.

12. The method according to claim 9, wherein adjusting the symmetrized set of real-life keypoints according to the predefined style associated with the avatar in the game includes one or more of face length adjustment, face width adjustment, facial feature adjustment, zoom adjustment, and eye shape adjustment.

13. An electronic apparatus comprising one or more processing units, memory coupled to the one or more processing units, and a plurality of programs stored in the memory that, when executed by the one or more processing units, cause the electronic apparatus to perform a plurality of operations of customizing a standard face of an avatar in a game using a two-dimensional (2D) facial image of a real-life person, comprising:

identifying a set of real-life keypoints in the 2D facial image;

transforming the set of real-life keypoints into a set of game-style keypoints associated with the avatar in the game;

generating a set of control parameters of the standard face of the avatar in the game by applying the set of game-style keypoints to a keypoint to parameter (K2P) neural network model, wherein the K2P neural network model is trained by:

obtaining a plurality of training 2D facial images of real-life persons;

generating a set of training game-style keypoints for each of the plurality of training 2D facial images;

feeding each set of training game-style keypoints into the K2P neural network model to obtain a set of control parameters;

feeding the set of control parameters into a pretrained parameter to keypoint (P2K) neural network model to obtain a set of predicted game-style keypoints corresponding to the set of training game-style keypoints; and updating the K2P neural network model by reducing a difference between the set of training game-style keypoints and the corresponding set of predicted game-style keypoints; and deforming the standard face of the avatar in the game based on the set of control parameters, wherein the deformed face of the avatar has facial features of the 2D facial image.

14. The electronic apparatus according to claim 13, wherein the pretrained P2K neural network model is configured to:

receive a set of control parameters that include bones or slider parameters associated with the avatar in the game; and predict a set of game-style keypoints for the avatar in the game in accordance with the set of control parameters.

15. The electronic apparatus according to claim 14, wherein the difference between the set of training game-style keypoints and the corresponding set of predicted game-style keypoints is a sum of mean square errors between the set of training game-style keypoints and the corresponding set of predicted game-style keypoints.

16. The electronic apparatus according to claim 13, wherein the trained K2P and the pretrained P2K neural network models are specific to the game.

17. The electronic apparatus according to claim 13, wherein transforming the set of real-life keypoints into the set of game-style keypoints includes:

normalizing the set of real-life keypoints into a canonical space;

symmetrizing the normalized set of real-life keypoints;

smoothing the set of symmetrized keypoints; and adjusting the symmetrized set of real-life keypoints according to a predefined style associated with the avatar in the game.

18. A non-transitory computer readable storage medium storing a plurality of programs for execution by an electronic apparatus having one or more processing units, wherein the plurality of programs, when executed by the one or more processing units, cause the electronic apparatus to perform a plurality of operations of customizing a standard face of an avatar in a game using a two-dimensional (2D) facial image of a real-life person, comprising:

identifying a set of real-life keypoints in the 2D facial image;

transforming the set of real-life keypoints into a set of game-style keypoints associated with the avatar in the game;

generating a set of control parameters of the standard face of the avatar in the game by applying the set of game-style keypoints to a keypoint to parameter (K2P) neural network model, wherein the K2P neural network model is trained by:

obtaining a plurality of training 2D facial images of real-life persons;

generating a set of training game-style keypoints for each of the plurality of training 2D facial images;

feeding each set of training game-style keypoints into the K2P neural network model to obtain a set of control parameters;

feeding the set of control parameters into a pretrained parameter to keypoint (P2K) neural network model to obtain a set of predicted game-style keypoints corresponding to the set of training game-style keypoints; and updating the K2P neural network model by reducing a difference between the set of training game-style keypoints and the corresponding set of predicted game-style keypoints; and deforming the standard face of the avatar in the game based on the set of control parameters, wherein the deformed face of the avatar has facial features of the 2D facial image.

19. The non-transitory computer readable storage medium according to claim 18, wherein the pretrained P2K neural network model is configured to:

receive a set of control parameters that include bones or slider parameters associated with the avatar in the game; and predict a set of game-style keypoints for the avatar in the game in accordance with the set of control parameters.

20. The non-transitory computer readable storage medium according to claim 18, wherein transforming the set of real-life keypoints into the set of game-style keypoints includes:

normalizing the set of real-life keypoints into a canonical space;

symmetrizing the normalized set of real-life keypoints; and adjusting the symmetrized set of real-life keypoints according to a predefined style associated with the avatar in the game.

* * * * *